United States Patent
Annis

(10) Patent No.: US 10,679,089 B2
(45) Date of Patent: Jun. 9, 2020

(54) SYSTEMS AND METHODS FOR OPTICAL CHARACTER RECOGNITION

(71) Applicant: Business Imaging Systems, Inc., Edmond, OK (US)

(72) Inventor: David Annis, Edmond, OK (US)

(73) Assignee: Business Imaging Systems, Inc., Edmond, OK (US)

( * ) Notice: Subject to any disclaimer, the term of this patent is extended or adjusted under 35 U.S.C. 154(b) by 225 days.

(21) Appl. No.: 15/858,355

(22) Filed: Dec. 29, 2017

(65) Prior Publication Data
US 2018/0189592 A1 Jul. 5, 2018

Related U.S. Application Data

(60) Provisional application No. 62/440,757, filed on Dec. 30, 2016.

(51) Int. Cl.
*G06K 9/34* (2006.01)
*G06K 9/00* (2006.01)
*G06K 9/46* (2006.01)

(52) U.S. Cl.
CPC ......... *G06K 9/344* (2013.01); *G06K 9/00463* (2013.01); *G06K 9/46* (2013.01); *G06K 2209/01* (2013.01)

(58) Field of Classification Search
CPC ........ G06K 9/00; G06K 9/00463; G06K 9/46; G06K 2209/01; G06F 17/5081; H01L 22/20; H01L 22/12; G06T 2207/20076; G06T 7/0006; G06T 2207/30148
See application file for complete search history.

(56) References Cited

U.S. PATENT DOCUMENTS

| | | | |
|---|---|---|---|
| 8,494,273 B2 * | 7/2013 | Chevion | G06K 9/344 382/168 |
| 8,773,733 B2 * | 7/2014 | Blose | G06K 9/723 358/450 |
| 2008/0162603 A1 * | 7/2008 | Garg | G06F 17/218 |

* cited by examiner

*Primary Examiner* — Yon J Couso
(74) *Attorney, Agent, or Firm* — Kevin E. West; Advent, LLP

(57) ABSTRACT

A method for iterative optical character recognition includes: performing an optical character recognition pass on an image; identifying a first character located in a first portion of the image, wherein an identification of the first character is associated with a first character confidence level that is at least a threshold character confidence level; identifying a second character located in a second portion of the image, wherein a first identification of the second character is associated with a second character confidence level that is below the threshold character confidence level; and performing an additional optical character recognition pass on the second portion of the image to identify the second character a second time when the second character confidence level that is below the threshold character confidence level.

20 Claims, 24 Drawing Sheets

| These are the words in a sentence. | There are different words in this sentence. | This sentence uses a much larger font than the others. This sentence uses a much larger font than the others. This sentence uses a much larger font than the others. This sentence uses a much |

(Column 1 repeated many times: "These are the words in a sentence."; Column 2 repeated many times: "There are different words in this sentence.")

These are the words in a sentence.
These are the words in a sentence.
These are the words in a sentence.

These are the words in a sentence.
These are the words in a sentence.
These are the words in a sentence.

These are the words in a sentence.
These are the words in a sentence.
These are the words in a sentence.

These are the words in a sentence.
These are the words in a sentence.
These are the words in a sentence.

These are the words in a sentence.
These are the words in a sentence.
These are the words in a sentence.

These are the words in a sentence.
These are the words in a sentence.
These are the words in a sentence.

These are the words in a sentence.
These are the words in a sentence.
These are the words in a sentence.

These are the words in a sentence.
These are the words in a sentence.
These are the words in a sentence.

These are the words in a sentence.
These are the words in a sentence.
These are the words in a sentence.

There are different words in this sentence.
There are different words in this sentence.
There are different words in this sentence.
There are different words in this sentence.
There are different words in this sentence.
There are different words in this sentence.
There are different words in this sentence.
There are different words in this sentence.
There are different words in this sentence.
There are different words in this sentence.
There are different words in this sentence.
There are different words in this sentence.

This sentence uses a much larger font than the others. } 802

This sentence uses a much larger font than the others.

This sentence uses a much larger font than the others.

This sentence uses a much

806 { larger font others. This
sentence words in this sentence.

words in this sentence.

This sentence

There are different than the

These are the words in a sentence.
These are the words in a sentence.
These are the words in a sentence.

These are the words in a sentence.
These are the words in a sentence.
These are the words in a sentence.

These are the words in a sentence.
These are the words in a sentence.
These are the words in a sentence.

These are the words in a sentence.
These are the words in a sentence.
These are the words in a sentence.

These are the words in a sentence.
These are the words in a sentence.
These are the words in a sentence.

These are the words in a sentence.
These are the words in a sentence.
These are the words in a sentence.

These are the words in a sentence.
These are the words in a sentence.
These are the words in a sentence.

These are the words in a sentence.
These are the words in a sentence.
These are the words in a sentence.

These are the words in a sentence.
These are the words in a sentence.
These are the words in a sentence.

These are the words in a sentence.
These are the words in a sentence.
These are the words in a sentence.

These are the words in a sentence.
These are the words in a sentence.
These are the words in a sentence.

These are the words in a sentence.
These are the words in a sentence.
These are the words in a sentence.

FIG. 9B

904 

There are different
words in this sentence.
There are different
words in this sentence.

There are different
words in this sentence.

There are different
words in this sentence.

There are different
words in this sentence.

There are different
words in this sentence.

There are different
words in this sentence.

There are different
words in this sentence.

There are different
words in this sentence.

There are different
words in this sentence.

There are different
words in this sentence.

There are different
words in this sentence.

This sentence uses a much larger font than the others. This sentence uses a much larger font than the others.

This sentence uses a much larger font than the others.

This sentence uses a much

SYSTEMS AND METHODS FOR OPTICAL CHARACTER RECOGNITION

CROSS-REFERENCE TO RELATED APPLICATIONS

The present application claims the benefit under 35 U.S.C. § 119(e) of U.S. Provisional Application Ser. No. 62/440,757, filed Dec. 30, 2016, and titled "SYSTEMS AND METHODS FOR OPTICAL CHARACTER RECOGNITION," which is incorporated herein by reference in its entirety.

BACKGROUND

Optical character recognition (OCR) can be used to convert an image (e.g., scan, picture, screenshot, etc.) into a searchable text document, such as a .doc file, .txt file, or the like. OCR can also be used to simply extract text from an image. For example, text may be extracted from an image and entered into a database for billing or payment processing, claim processing, maintaining profiles of various individuals, and so forth.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 7 shows an example of a source document that can be analyzed by an OCR system, such as the system illustrated in FIG. 1, by employing one or more processes (e.g., any of the processes illustrated in FIGS. 3 through 6D) to perform OCR analysis, document classification, and/or data extraction.

FIG. 8A shows an example of an image that can be analyzed in a first OCR pass of an iterative OCR process, such as the process illustrated in FIG. 4B.

FIG. 8B shows an example of an image that can be analyzed in a second OCR pass of an iterative OCR process, such as the process illustrated in FIG. 4B.

FIG. 9B shows an example of an image that can be analyzed in a first OCR pass on a first section/cell according to a cell-based OCR process, such as the process illustrated in FIGS. 4C and 4D.

FIG. 9C shows an example of an image that can be analyzed in a second OCR pass on a second section/cell according to a cell-based OCR process, such as the process illustrated in FIGS. 4C and 4D.

FIG. 9D shows an example of an image that can be analyzed in a third OCR pass on a third section/cell according to a cell-based OCR process, such as the process illustrated in FIGS. 4C and 4D.

FIG. 10 shows an example segmentation of an image that can be analyzed with a segment-based OCR process, such as the process illustrated in FIGS. 4E and 4F.

DETAILED DESCRIPTION

Overview

Figure 1:
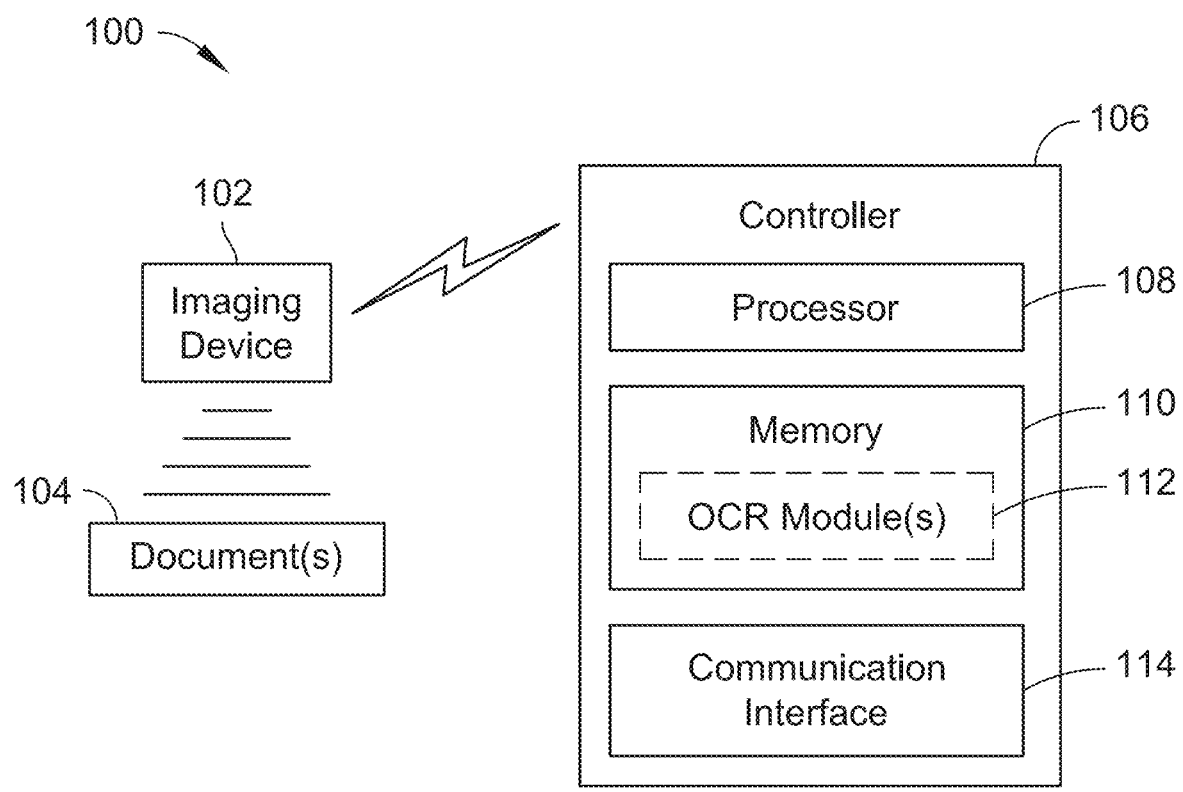
FIG. 1 is block diagram illustrating a system for OCR analysis, in accordance with an example embodiment of the present disclosure.

OCR is the optical recognition of text characters contained within a digitized image. OCR can be used to turn a rasterized image into useable text. OCR is used in many document imaging and data capture applications to extract data elements from a document.

There are a number of OCR engines that use slightly different approaches and character identification algorithms to process an image. Many of these operate under similar principles. OCR is typically run on one image at a time. An OCR engine first ensures that all images received are bi-tonal. If they are not, the images must first be converted to bi-tonal. Once a bi-tonal image is received or created, the OCR engine analyzes each entire horizontal row of pixels, counting the number of black vs. white pixels. Through analysis, this will typically reveal to the OCR Engine where a line of text appears to exist on an image. Then the same approach is performed on each line of text, but counting the number of black vs. white pixels on each vertical column of pixels. This will indicate to the OCR engine where each character starts and stops within a row. The OCR engine defines a character area (e.g., a rectangular area) having a width and a height for each character detected in a row. The OCR engine can then analyze each resulting character area to identify a respective character, the font size, and the x-y coordinates of the character on the image.

OCR engines suffer from a few similar issues that are commonly encountered when processing a document. One problem is that when photographs, logos, or other large, non-text elements are present on a document, side-by-side with text, the black pixels created by the non-text elements can confuse the line detection algorithm and can cause the entire rows of text to be missed entirely. For example, a document may include a logo present in the top left corner of the document and several text elements directly to the right of the logo. In such a case, the large blob of black pixels created by the logo can cause an OCR engine processing the document to miss the adjacent text elements. Another problem occurs commonly on documents with a multi-column layout. If the font size and/or line spacing is different between columns of text on a single page, the OCR engine's line detection can be slightly inaccurate by a few pixels. This shift can be just far enough to cause one or more sections of text to be read very poorly by the OCR engine (e.g., where many characters are not detected or misidentified by the OCR engine).

This disclosure relates to an OCR system (e.g., a processor running an OCR engine) that employs iterative OCR, cell-based OCR, segment-based OCR, or a combination thereof. In general, as used herein the term "OCR engine" includes one or more software modules (e.g., OCR modules) that can be executed by a processor (e.g., microprocessor, microcontroller, programmable logic device, ASIC, or the like) from a memory (e.g., hard disk drive (HDD), solid-state disk (SSD), flash memory, USB memory device, SD card, etc.) that is communicatively coupled to the processor.

In an iterative OCR implementation, a number of OCR iterations can be configured (e.g., pre-programmed, manually selected, or the like). For example, suppose three iterations are configured. The OCR system can perform a first OCR pass on the entire image. The OCR system can then report a confidence level for each character identified. The OCR system will then identify the pixel coordinates of each confidently identified character. In an embodiment, the OCR system can generate a new image that removes or obscures (e.g., whites out) the portions of the image that are associated with confidently identified characters (e.g., identified characters having at least at a threshold confidence level). The OCR system can then run a second iteration (e.g., a second OCR pass) on the new image to reprocess portions of the image that did not meet the confidence threshold (e.g., portions including identified characters having a confidence level that is less than the threshold confidence level). In some embodiments, the generated image is not actually saved to disk but only exists in a temporary memory (e.g., in RAM). In other embodiments, the generated image is saved to the disk (e.g., in a temporary file storage or the like). In this example, the process repeats one more time (since three iterations were requested). This example is provided for explanatory purposes; however, it shall be understood that any number of iterations can be configured (e.g., 2, 3, 4, 5, etc.). Once the OCR passes are complete, the OCR system can then synthesize the text back together as a single result (e.g., in a single document, text file, or the like) containing identified characters from each iteration, wherein an identification for a character that is identified in multiple iterations (e.g., at the same location (x-y coordinates) of the image) may be selected based upon a comparison of respective confidence levels associated with the different OCR iterations. For example, the identification associated with the highest confidence level can be selected.

In a cell-based OCR implementation, a number of sections can be configured (e.g., pre-programmed, manually selected, or the like) for a page. For example, suppose two image rows and two image columns are configured. The OCR system can perform a first OCR pass on the entire image. The OCR system can then report a confidence level for each character identified. In an embodiment, the OCR system can generate new images for respective cells (also referred to herein as "sections" or "regions of interest") defined by the specified number of image rows and/or image columns. In this example, where two image rows and two image columns are configured, the image cells yield a 2×2 grid. Therefore, the image is split into four cell images. In some embodiments, the generated image is not actually saved to disk but only exists in a temporary memory (e.g., in RAM). In other embodiments, the generated image is saved to the disk (e.g., in a temporary file storage or the like). The OCR system can then perform an OCR pass on each of the individual cell images. This example is provided for explanatory purposes; however, it shall be understood that any number and arrangement of cells can be configured (e.g., 1×2, 1×3, 1×4, 2×1, 3×1, 4×1, 2×2, 2×3, 2×4, 3×2, 4×2, 3×3, 3×4, 4×3, 4×4, etc.). Once the OCR passes are completed for each of the image cells, the OCR system can synthesize the text back together as a single result (e.g., in a single document, text file, or the like) containing identified characters from each of image cells. In an embodiment, the OCR system can configure the image cells to have overlapping borders so that characters located at the intersection of two or more image cells can be accurately detected. To avoid multiple counts of a same character (e.g., a character identified in two or more cells), when OCR passes for different cells identify a character at the same location (e.g., x-y coordinates) of the image, the OCR system can be configured to select an identification for the character based upon a comparison of respective confidence levels associated with the different OCR passes. For example, the identification associated with the highest confidence level can be selected.

In a segment-based OCR implementation, the OCR system can be configured to detect segments of text in an image and reprocess certain ones of the segments when they do not meet a threshold confidence level (e.g., when an average confidence level for identified characters in a segment is less than the threshold confidence level). In an embodiment, a "segment" can include string of text which is preceded and followed by a threshold amount of whitespace, such as the beginning of document, end of document, tab, carriage return, line feed, or form feed. The OCR system can run an analysis of each segment of text after performing a first OCR pass of OCR on an image to determine a confidence level for each segment. For example, the OCR system can calculate the average character confidence level returned by the OCR engine across all characters within a segment. The OCR system can compare the confidence level for a segment with a configured confidence level threshold (e.g., measured in %) to determine whether or not to reprocess the segment. For example, if the threshold confidence level is set to 80%, and the OCR engine reports an average confidence level for a segment to be 75%, then the OCR system will reprocess the segment. When a segment is to be reprocessed, the OCR system can generate a temporary image including only the region of the original image containing that segment of text. For example, segments that do not meet the confidence level threshold on the first OCR pass can be individually reprocessed. Upon reprocessing the segments that did not meet the threshold confidence level in the first OCR pass, the OCR system can be configured to synthesize the initially processed and the reprocessed text back together as a single result (e.g., in a single document, text file, or the like), wherein if the confidence level for a segment is improved from the first OCR pass, character identifications associated with the reprocessed segment will be selected. That is, after the reprocessing of a segment, the OCR system can examine the average OCR confidence of all OCR characters from the first OCR pass performed on the segment and the second OCR pass performed on the segment, and then the OCR system can keep the entirety of whichever character identification for the segment has the highest confidence, discard the other, and then blend these results back into a final OCR result for the image.

EXAMPLE IMPLEMENTATIONS

FIG. 1 illustrates an embodiment of an OCR system 100. The OCR system includes a controller 106 configured to carry out various functionalities, operations, or processing blocks of the OCR system 100 that are described herein. For example, the controller 106 includes at least one processor 108 configured to execute one or more software modules (e.g., OCR modules 112) stored in a memory 110. In implementations, the OCR modules 112, when executed, are configured to cause the controller 106 to perform one or more of the processes illustrated in FIGS. 2 through 6D, which are further described herein. The terms "controller," "functionality," "service," and "logic" as used herein generally represent software, firmware, hardware, or a combination of software, firmware, or hardware in conjunction with controlling the OCR system 100. In the case of a software implementation, the module, functionality, or logic represents program code (e.g., algorithms embodied in a non-transitory computer readable medium) that performs specified tasks when executed on a processor (e.g., central processing unit (CPU) or CPUs). The program code can be stored in one or more non-transitory computer-readable memory devices or media (e.g., internal memory and/or one or more tangible media), and so on. For example, memory may include but is not limited to volatile memory, non-volatile memory, Flash memory, SRAM, DRAM, RAM and ROM. The structures, functions, approaches, and techniques described herein can be implemented on a variety of commercial computing platforms having a variety of processors.

As shown in FIG. 1, the controller 106 includes processor 108, memory 110, and a communication interface 114. The processor 108 provides processing functionality for at least the controller 106 and can include any number of processors, micro-controllers, circuitry, field programmable gate array (FPGA) or other processing systems, and resident or external memory for storing data, executable code, and other information accessed or generated by the controller 106. The processor 108 can execute one or more software programs (e.g., OCR modules 112) embodied in a non-transitory computer readable medium (e.g., memory 110) that implement techniques described herein. The processor 108 is not limited by the materials from which it is formed or the processing mechanisms employed therein and, as such, can be implemented via semiconductor(s) and/or transistors (e.g., using electronic integrated circuit (IC) components), and so forth.

The memory 110 can be an example of tangible, computer-readable storage medium that provides storage functionality to store various data and or program code associated with operation of the controller 106, such as software programs and/or code segments, or other data to instruct the processor 108, and possibly other components of the OCR system 100/controller 106, to perform the functionality described herein. Thus, the memory 110 can store data, such as a program of instructions (e.g., OCR modules 112) for operating the OCR system 100 (including its components), and so forth. It should be noted that while a single memory 110 is described, a wide variety of types and combinations of memory (e.g., tangible, non-transitory memory) can be employed. The memory 110 can be integral with the processor 108, can comprise stand-alone memory, or can be a combination of both.

Some examples of the memory 110 can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the OCR system 100 and/or the memory 110 can include removable integrated circuit card (ICC) memory, such as memory provided by a subscriber identity module (SIM) card, a universal subscriber identity module (USIM) card, a universal integrated circuit card (UICC), and so on.

The controller 106 may include a communication interface 114. The communication interface 114 can be operatively configured to communicate with components of the OCR system 100. For example, the communication interface 114 can be configured to transmit data for storage in the OCR system 100, retrieve data from storage in the OCR system 100, and so forth. The communication interface 114 can also be communicatively coupled with the processor 108 to facilitate data transfer between components of the OCR system 100 and the processor 108 (e.g., for communicating inputs to the processor 108 received from a device (e.g., imaging device 102) communicatively coupled with the OCR system 100/controller 106). It should be noted that while the communication interface 114 is described as a component of controller 106, one or more components of the communication interface 114 can be implemented as external components communicatively coupled to the OCR system 100 via a wired and/or wireless connection. The OCR system 100 can also include and/or connect to one or more input/output (I/O) devices (e.g., via the communication interface 114), such as a display, a mouse, a touchpad, a touchscreen, a keyboard, a microphone (e.g., for voice commands), imaging device 102, and so on.

In embodiments, the OCR modules 112 comprise one or more OCR engines that cause the processor 108 to perform OCR analysis on an image when an OCR engine is executed/run by the processor 108. The OCR modules 112 can also include one or more modules that cause the processor 108 to perform iterative OCR, cell-based OCR, segment-based OCR, or combinations thereof when the OCR modules 112 are executed/run by the processor 108. The controller 106 can be configured to perform one or more OCR processes on an image (e.g., scan, picture, screenshot). The image may be generated by the controller 106 (e.g., a screenshot) or received from an imaging device (e.g., a scanner or camera), a controller/computing system, an external memory device (e.g., flash drive, SD card, external HDD or SSD, etc.), remote server, cloud storage, or the like. In an embodiment, the controller 106 may be communicatively coupled (e.g., by wired, wireless, and/or network connection) to an imaging device 102 (e.g., a scanner or camera) that is configured to generate an image of a scanned or photographed document 104, or multiple documents 104 (e.g., several pages/documents scanned through a feeder).

FIGS. 2 through 6D illustrate example processes 200 that employ an OCR system, such as the OCR system 100 illustrated in FIG. 1, for OCR analysis, document classification, and/or data extraction. For example, the controller 106/processor 108 can execute OCR modules 112 from memory 110 that cause the controller 106/processor 108 to perform process 200, process 300, process 400, process 500, and/or process 600. In general, operations of disclosed processes (e.g., process 200, process 300, process 400, process 500, and/or process 600) may be performed in an arbitrary order, unless otherwise provided in the claims.

Figure 2:
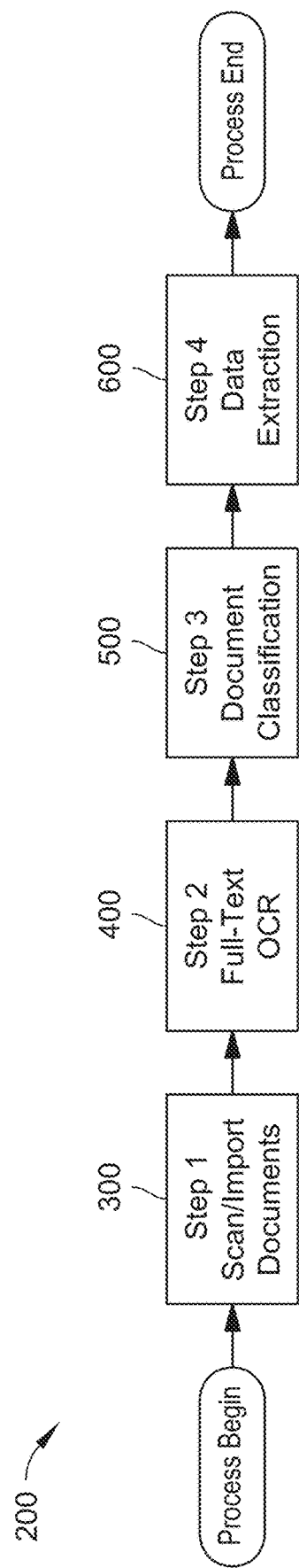
FIG. 2 is a flow diagram illustrating a process that employs an OCR system, such as the system illustrated in FIG. 1, for OCR analysis, document classification, and data extraction, in accordance with an example implementation of the present disclosure.

As shown in FIG. 2, a process (e.g., process 200) can include one or more processes/sub-processes. For example, process 200 can include: scanning/importing documents (process 300); performing OCR on scanned/imported documents (process 400); classifying scanned/imported documents (process 500); and/or extracting data (e.g., extracting text/information) from scanned/imported documents (process 600). It is noted, however, that one or more of the processes/sub-processes (e.g., process 300, process 400, process 500, and/or process 600) can be performed individually, or in any combination.

Figure 3:
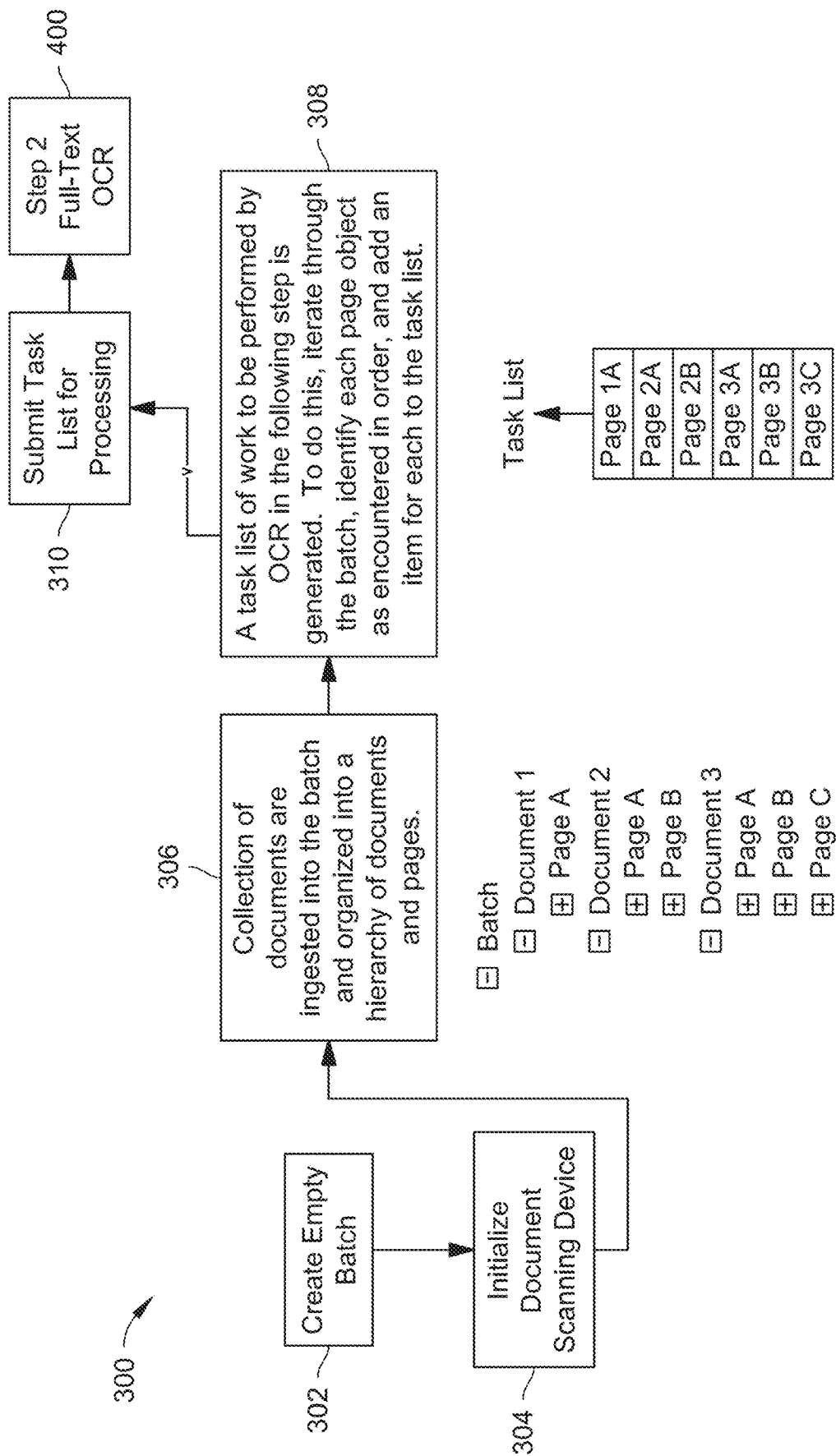
FIG. 3 is a flow diagram illustrating a process that employs an OCR system, such as the system illustrated in FIG. 1, to scan or import documents for OCR analysis, document classification, and data extraction, in accordance with an example implementation of the present disclosure.

FIG. 3 illustrates a process 300 for scanning or importing documents for OCR analysis, document classification, and/data extraction, in accordance with an example implementation of the present disclosure. An empty batch is first created (block 302). For example, the controller 106 can be configured to generate (e.g., open) a batch file for OCR processing. Documents/images are then scanned or imported, and the scanned or imported documents/images are saved to memory (e.g., memory 110, or another memory communicatively coupled to controller 106) (block 304). For example, the controller 106 can be configured to receive documents/images (e.g., documents 104) from an imaging device, from memory, and/or from another device, server, or the like. The scanned or imported documents/images are then organized into a hierarchy of documents and pages (e.g., document 1 with page A, document 2 with pages A and B, document 3 with pages A, B, and C, and so on) in the batch for OCR processing (block 306). For example, the controller can be configured to store the documents/images in the batch file with information regarding the number of pages in each document/image. A task list for the batch is then generated based on the pages encountered in each document (block 308). For example, the controller 106 can be configured to generate a task list including a listing of each page with an identifier that indicates the document and page number/reference character (e.g., page 1A, page 2A, page 2B, page 3A, page 3B, page 3C, and so on). The task list is then submitted for processing (block 310). For example, the controller 106 can be configured to proceed to performing OCR analysis (process 400) on the documents/images based on the task list.

FIGS. 4A through 4G illustrate a process 400 for performing OCR analysis on one or more documents, in accordance with an example implementation of the present disclosure. The controller 106 can be configured to load pre-configured OCR settings (block 401). For example, the controller 106 can be configured to run an OCR engine defined by the OCR modules 112 executed by the controller 106/processor 108. The controller 106 may load a task list, such as the task list generated at the end of process 300 (block 402). The controller 106 may begin to process each item (e.g., document/image, or page of a document) in the task list (block 403). For example, the controller 106 can be configured to determine if any items are available in the task list (e.g., items that are waiting to be processed) (block 404).

For each item, the controller 106 is configured to perform OCR on an image (e.g., an image/document from memory, or an image of a document, such as document 104) (block 407). In an embodiment, the controller 106 performs an OCR pass on an image by carrying the following operations. The controller 106 is configured to analyze each horizontal row of pixels making up the image, counting the number of black vs. white pixels. Based on this analysis, the controller 106 is configured to determine where a line of text appears to exist on the image. The controller 106 then analyzes each line of text by counting the number of black vs. white pixels on each vertical column of pixels in a respective line of text. The controller 106 is configured to determine where respective characters in each line of text start and stop based on the whitespace between characters. The controller 106 is configured to define a character area (e.g., a rectangular area) having a width and a height for each character detected in a row. The controller 106 can then analyze each resulting character area to identify the character in the character area. For example, the controller 106 can be configured to compare a character image defined by pixels in a respective character area with a database of characters to determine what character matches the character image. In this manner, the controller 106 can identify characters in the image. The controller 106 can also be configured to determine the font, font size, and the x-y coordinates of the character. The controller 106 may be configured to generate a master OCR results file including each identified character, a character confidence level associated with each identified character, a location (e.g., x-y coordinate) for each identified character, and a size (e.g., font size) of each identified character (block 408)

Figure 4A:
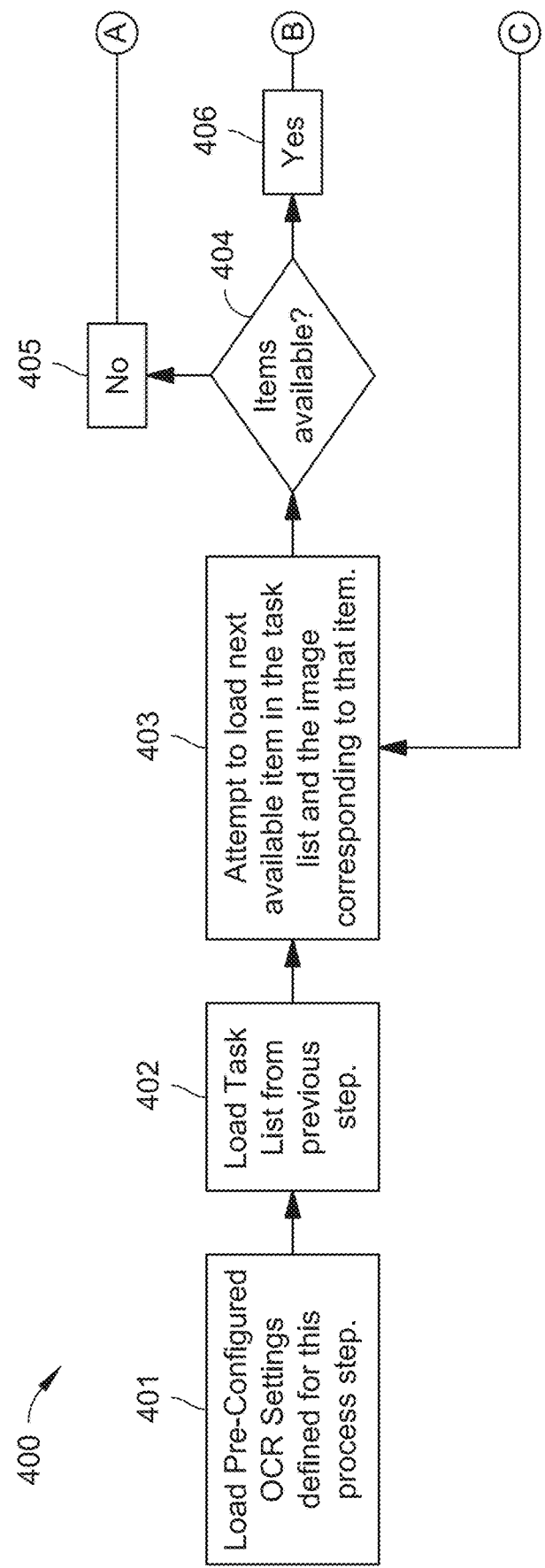
FIG. 4A is a flow diagram illustrating part of a process that employs an OCR system, such as the system illustrated in FIG. 1, to perform OCR analysis on one or more documents, in accordance with an example implementation of the present disclosure.
Figure 4B:
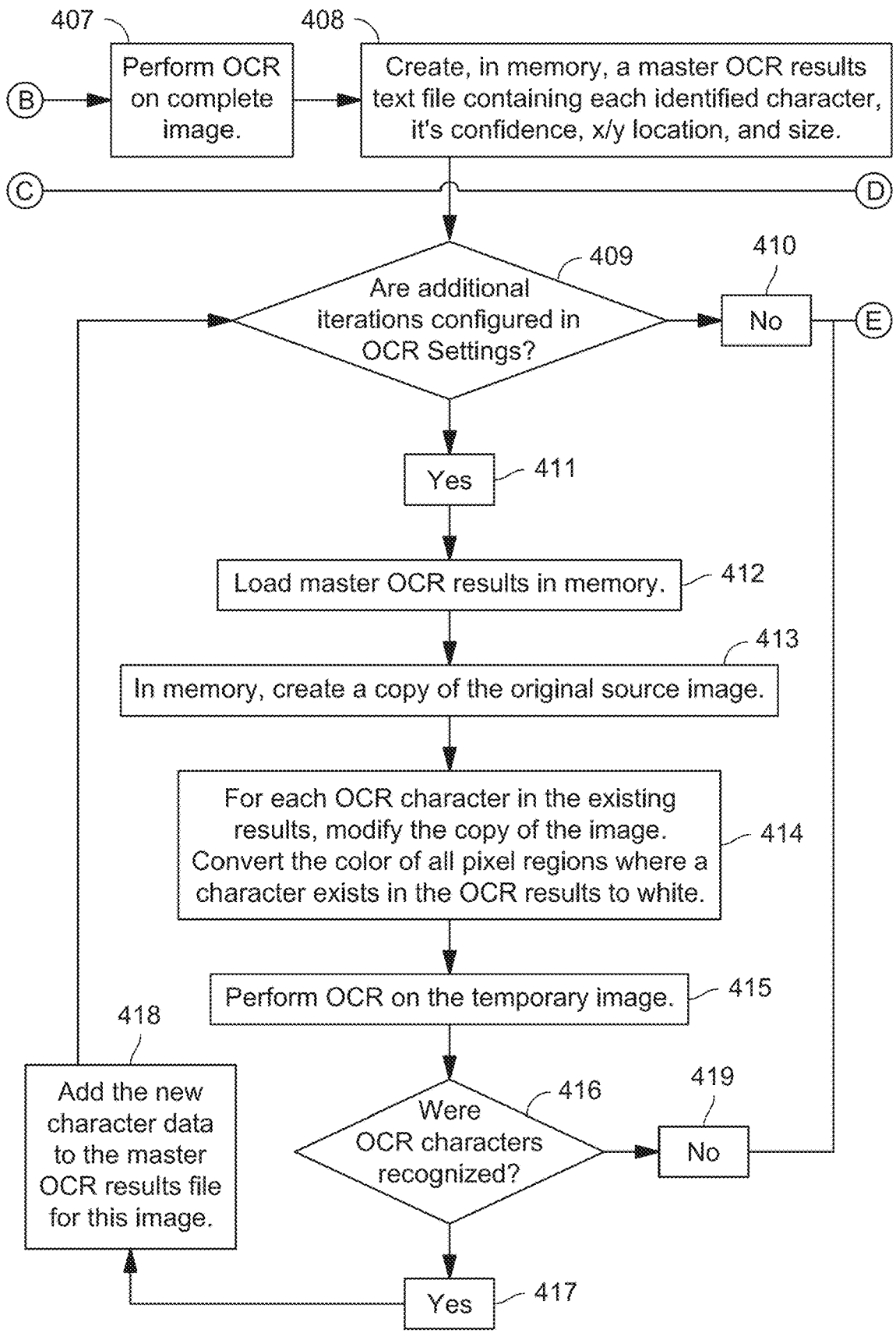
FIG. 4B is a flow diagram illustrating part of a process that employs an OCR system, such as the system illustrated in FIG. 1, to perform OCR analysis on one or more documents, in accordance with an example implementation of the present disclosure.

In implementations, the controller 106 is further configured to perform one or more of the OCR processes (iterative OCR, cell-based OCR, and segment-based OCR) described herein with reference to FIGS. 4B through 4F. For example, as shown in FIG. 4B, the controller 106 may be configured to perform several OCR iterations (block 409). If iterative OCR processing is not enabled (block 410) or unsuccessful (block 419), the controller 106 may be configured to terminate OCR analysis or perform cell-based OCR and/or segment based OCR to achieve improved identifications of one or more characters. If iterative OCR processing is enabled (block 411), the controller 106 is configured to load master OCR results in memory at the start/end of each iteration (block 412). The controller 106 is then configured to generate a copy of the image for another (next) OCR pass/iteration (block 413). The controller 106 may be configured to store the copy of the image to temporary memory (e.g., RAM) or to a static memory (e.g., HDD, flash memory, SDD, or the like). For each recognized OCR character (e.g., each character having a character confidence level that is at least the threshold character confidence level), the controller 106 is configured to modify the copy of the image by removing a respective portion of the image corresponding to the recognized character (block 414). For example, the controller 106 can be configured to convert the color of all pixel regions where a recognized character exists in the OCR results to white. The controller 106 is configured to perform an OCR pass/iteration on the modified copy of the image to identify (or attempt to identify) all other characters (e.g., characters that had character confidence levels below the threshold character confidence level) another time (block 415).

In an example implementation, the controller may perform an OCR pass on an image to identify a plurality of characters of the image, where the controller identifies a first character located in a first portion of the image, wherein an identification of the first character is associated with a first character confidence level that is at least a threshold character confidence level (i.e., the first character is recognized), and the controller identifies a second character located in a second portion of the image, wherein a first identification of the second character is associated with a second character confidence level that is below the threshold character confidence level (i.e., the second character is not recognized). In such a case, the controller may perform an additional OCR pass on the second portion of the image to identify the second character a second time, wherein a second identification of the second character is associated with a third character confidence level. The controller 106 may be configured to select the first identification of the second character or the second identification of the second character based upon a comparison of the second character confidence level and the third character confidence level.

The controller 106 may be configured to determine whether a character was recognized in second/subsequent identification of a character (e.g., with a character confidence level at or above the threshold level), or whether the character confidence level improved from previous OCR passes/iterations (block 416). If there was an improvement and/or successfully character recognition (block 417), the controller 106 is configured to update the master OCR results list by adding the identified character or replacing a previous entry with the identified character from the latest OCR pass/iteration (block 418). The process 400 can repeat blocks 409 through 418 until all characters are successfully recognized or until a predetermined (e.g., pre-programmed or user-defined) number of OCR iterations/passes have been performed.

FIG. 7 shows an example of a document (e.g., document 104 or an imported document/image) having multiple text font sizes distributed among three different columns. FIGS. 8A and 8B illustrate an example of iterative OCR processing that can be carried out by the controller 106 on the document shown in FIG. 7. For example, FIG. 8A shows an example of an image used for a first OCR pass having all of the original text 800 present. The controller 106 may identify at least a first character located in a first portion 802 of the image, wherein an identification of the first character is associated with a first character confidence level that is at least a threshold character confidence level. The controller 106 may also identify at least a second character located in a second portion 806 of the image, wherein a first identification of the second character is associated with a second character confidence level that is below the threshold character confidence level. When this occurs, the controller 106 can be configured to reprocess the second portion 806 of the image by performing another OCR iteration. For example, the controller 106 is configured to perform a second OCR pass on the second portion 806 of the image to identify the second character a second time, wherein a second identification of the second character is associated with a third character confidence level. In an embodiment, to reprocess the second portion 806, the controller 106 is configured to generate a new image 804 that removes or obscures (e.g., whites out) the portions (e.g., portion 802) of the image that are associated with confidently identified/recognized characters. FIG. 8B shows an example of a new image used for a second OCR pass having portions of text 804 that did not meet the confidence level threshold after the OCR first pass. The controller 106 can then run a second iteration (e.g., perform the second OCR pass) on the new image to reprocess portions (e.g., portion 806) of the image that did not meet the confidence threshold. In some embodiments, the generated image is not saved to memory 110 but only exists in a temporary memory (e.g., in RAM). In other embodiments, the generated image is saved to memory 110 (e.g., in a temporary file storage or the like).

The number of iterations may be predefined (e.g., pre-programmed) or manually selected (e.g., set via user input). After the iterations are performed, the controller 106 is configured to synthesize the text (e.g., the identified characters) together as a single result containing identified characters from each iteration, wherein an identification for a character that is identified in multiple iterations (e.g., at the same location (x-y coordinates) of the image) may be selected based upon a comparison of respective confidence levels associated with the different OCR iterations. In this regard, the controller 106 can be configured to select the first identification of the second character or the second identification of the second character based upon a comparison of the second confidence level and the third confidence level. For example, the identification associated with the highest confidence level can be selected and used to synthesize the resulting text. In some implementations, after all OCR iterations are performed, the master OCR list includes a list of characters having identifications that met the character confidence threshold from each OCR pass, the exact size and X,Y coordinate (location) of each character, and the character confidence level/score generated by the OCR engine. The controller 106 may be configured to determine if there are characters identified by different iterations that are overlapping. If an overlap is found, the controller 106 can be configured to retain whichever character had the highest confidence of all iterations and discard the other overlapping character identifications.

Figure 4C:
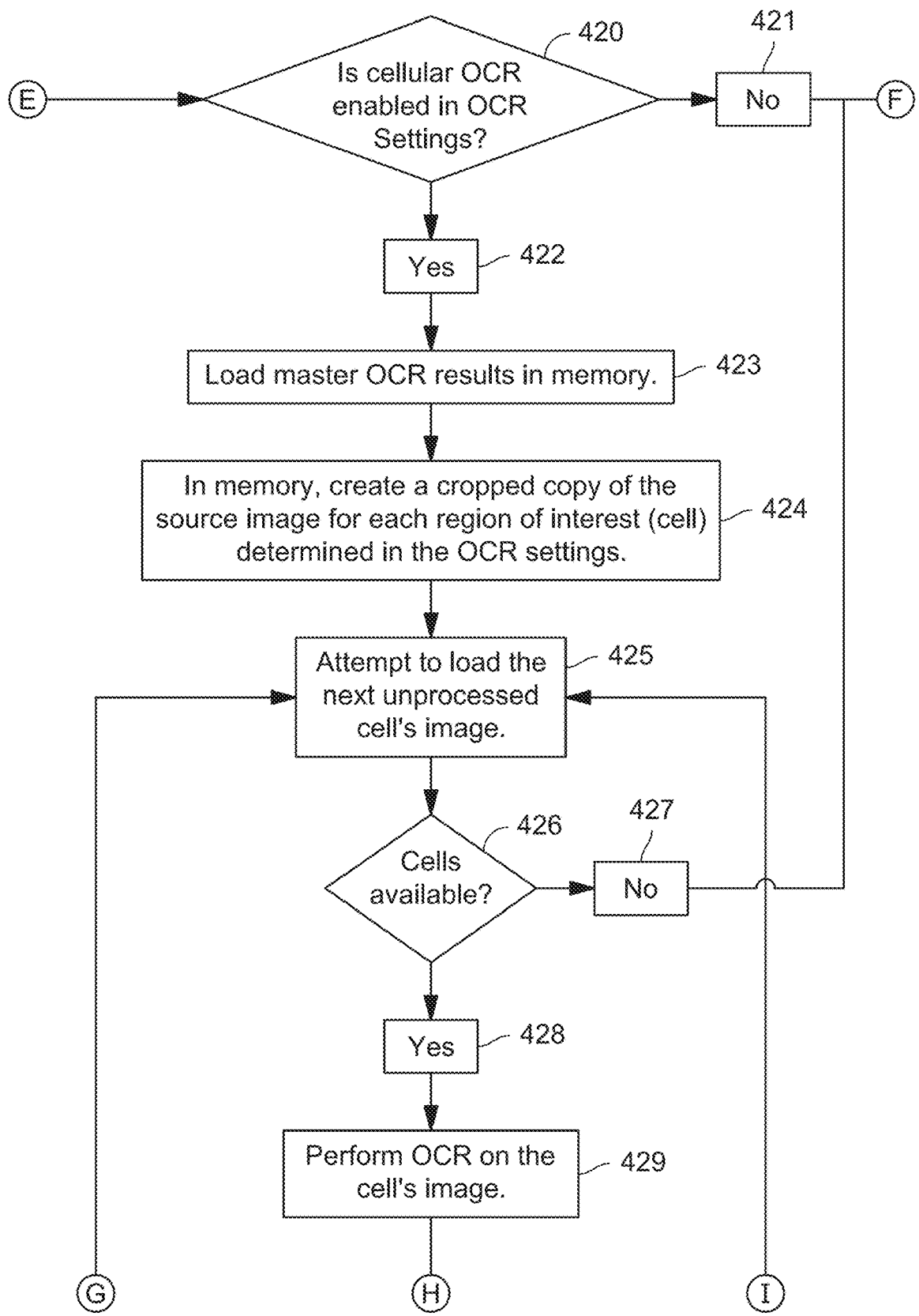
FIG. 4C is a flow diagram illustrating part of a process that employs an OCR system, such as the system illustrated in FIG. 1, to perform OCR analysis on one or more documents, in accordance with an example implementation of the present disclosure.
Figure 4D:
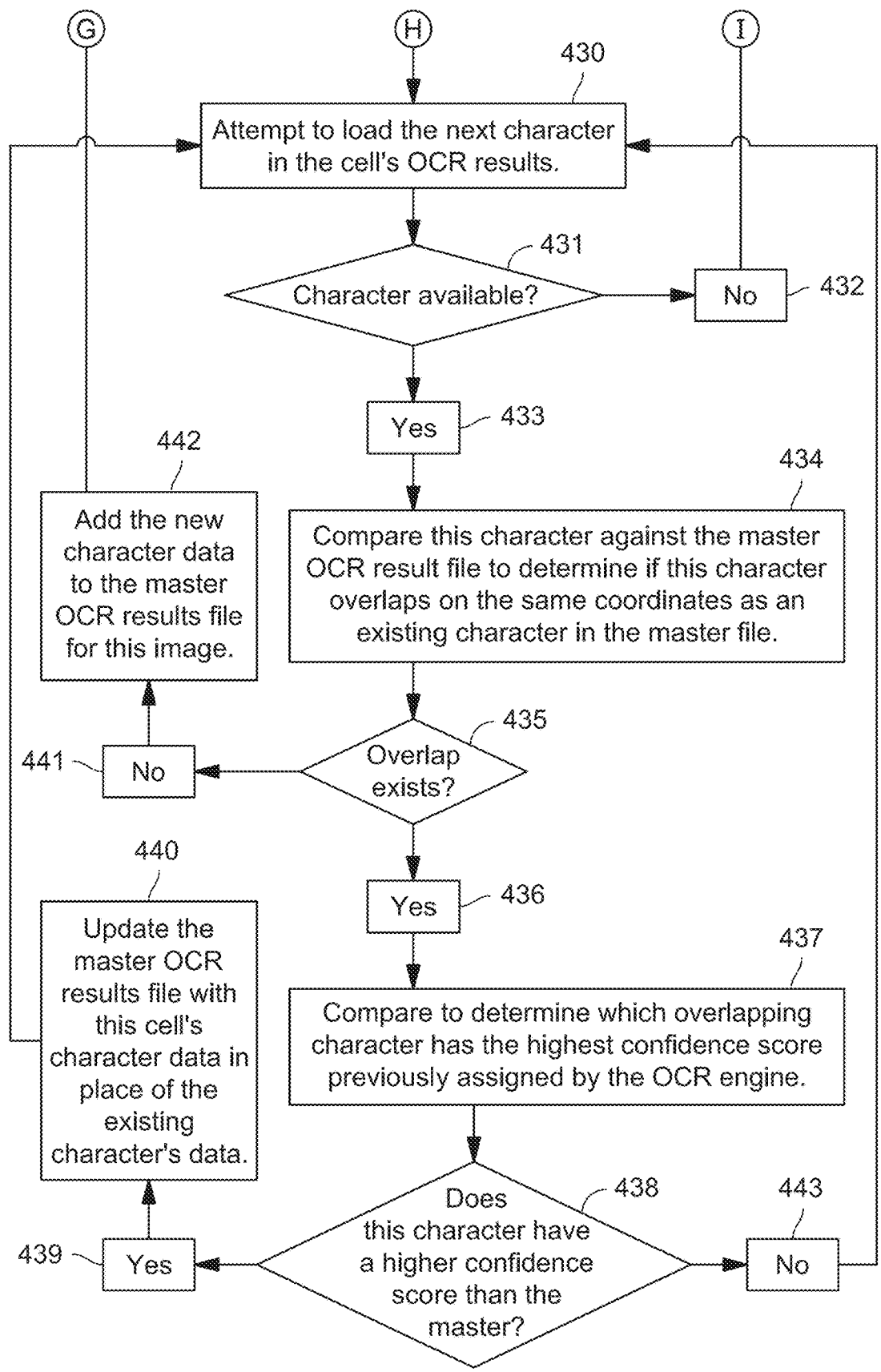
FIG. 4D is a flow diagram illustrating part of a process that employs an OCR system, such as the system illustrated in FIG. 1, to perform OCR analysis on one or more documents, in accordance with an example implementation of the present disclosure.

As shown in FIGS. 4C and 4D, in implementations, the controller 106 may be configured to perform section/cell-based OCR analysis on one or more documents/images (block 420). If cell-based OCR processing is not enabled (block 421) or OCR analysis has been performed on all of the cells/sections (block 427), the controller 106 may be configured to terminate processing or perform segment based OCR to achieve improved identifications of one or more characters. If cell-based OCR processing is enabled (block 422), the controller 106 is configured to load master OCR results in memory (block 423). The controller 106 is then configured to generate a cropped copy of the image for region of interest (e.g., each section/cell) of the image (block 424). The controller 106 is then configured to process the sections/cells, one at a time. For example, the controller 106 can attempt to load an unprocessed section/cell (block 425). When the controller 106 determines that an unprocessed section/cell is available for OCR analysis (blocks 426 and 428), the controller performs OCR analysis on the cropped copy of the image that is associated with that section/cell (block 429). After performing the OCR analysis for a section/cell, the controller 106 attempts to load each identified character in the OCR results list for the section/cell (block 430). If there are no more identified characters (blocks 431 and 432), the controller 106 is configured to process the next section/cell (block 425). If there are identified characters (blocks 431 and 433), the controller 106 is configured to compare the identified character against the master OCR results list to determine if the identified character has overlapping coordinates with a previously recognized character in the master OCR results list (block 434). When there is no overlap (blocks 435 and 441), the controller is configured to add the identified character to the master OCR list for the image/document being analyzed (block 442). When there is an overlap between the identified character and a previously recognized character in the master OCR results list (blocks 435 and 436), the controller 106 is configured to compare the identified character and the previously recognized character to determine which of the two has the highest character confidence level (block 437). If the previously recognized character has a higher character confidence level than the identified character (blocks 438 and 443), the master OCR results list remains unchanged, and the controller 106 performs the same analysis on the next identified character (if available) (block 430). If the identified character has a higher character confidence level than the identified character (blocks 438 and 439), the controller 106 is configured to update the master OCR results list by replacing the information corresponding to the previously recognized character with the information corresponding to the identified character (block 442). The controller 106 performs the same analysis on the next identified character (if available) (block 430), until all characters for the section/cell have been identified (e.g., block 432), and then the controller 106 processes the next section/cell, until all the sections/cells have been processed (block 427).

Figure 9A:
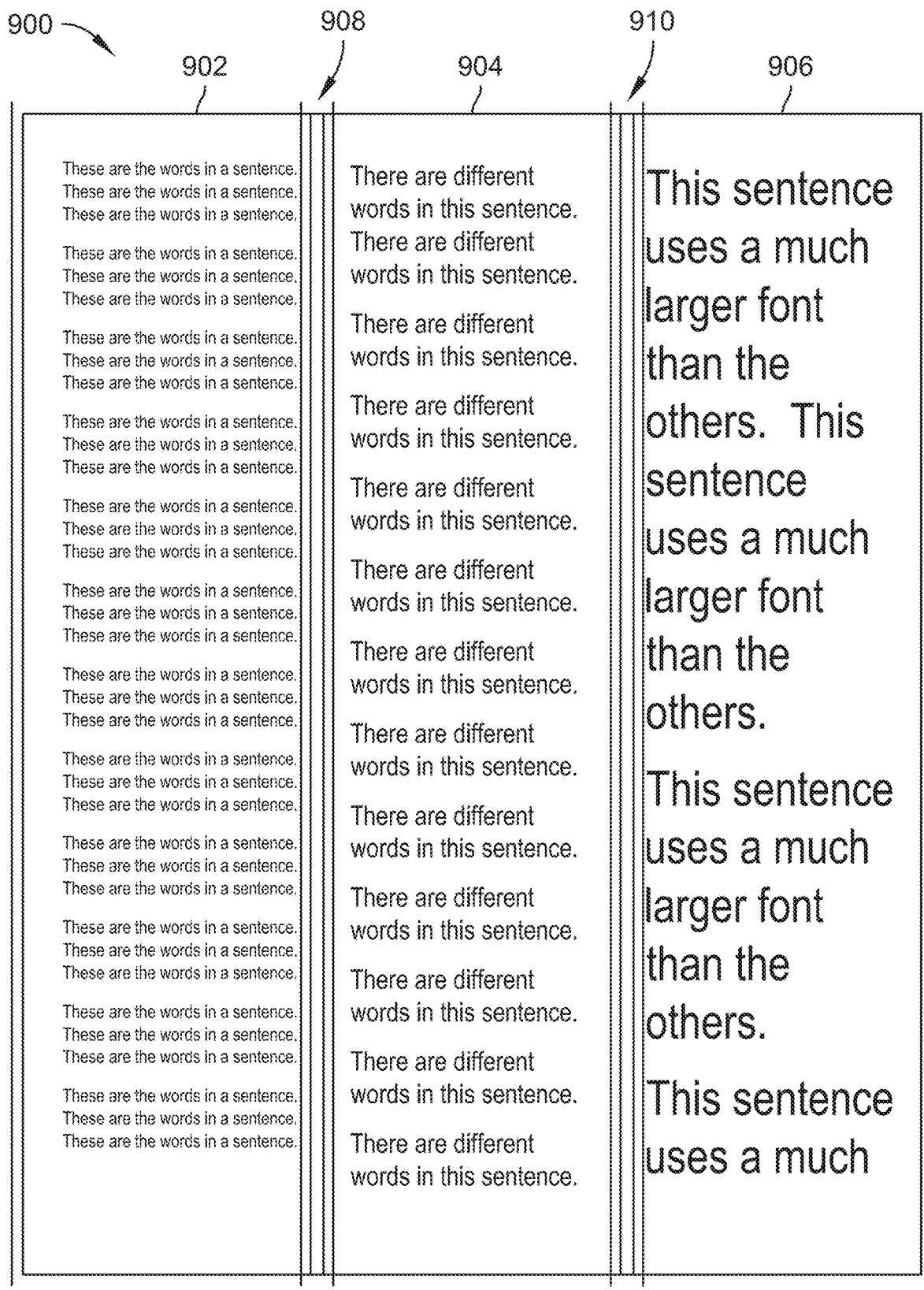
FIG. 9A shows an example section/cell distribution of an image that can be analyzed with a cell-based OCR process, such as the process illustrated in FIGS. 4C and 4D.

FIGS. 9A through 9D illustrate an example of cell-based OCR processing that can be carried out by the controller 106. In an implementation, the controller 106 can be configured to define at least a first section (e.g., section 902) and a second section (e.g., section 904) of an image 900. The number and arrangement of sections or cells can be configured (e.g., pre-programmed, manually selected, or the like) for a page. In an example shown in FIG. 9A, the controller 106 is configured to define three sections (e.g., 1 row, 3 columns (sections 902, 904, 906)). The controller 106 may be configured to perform a first OCR pass on the entire image and report a confidence level for each character identified. The controller 106 can generate new images for respective sections or cells defined by the specified number of image rows and/or image columns. In the example shown in FIG. 9A, the image is split into three columns, where each column defines a respective section or cell (e.g., sections 902, 904, and 906). The controller 106 can generate a respective image for each of the sections or cells (e.g., as shown in FIGS. 9B through 9D). In some embodiments, the generated images are not saved to memory 110 but only exists in a temporary memory (e.g., in RAM). In other embodiments, the generated image is saved to memory 110 (e.g., in a temporary file storage or the like). The controller 106 is configured to perform an OCR pass on each of the individual sections or cells (e.g., each of the separate images shown in FIGS. 9B through 9D). After the OCR passes are completed for all of the section or cell images, the controller 106 is configured to synthesize the text together as a single result (e.g., in a single document, text file, or the like) containing identified characters from each of sections or cells. Processing each of the image cells separately can improve accuracy of character identification and/or detection because the sections can be selected to maintain similar font sizes or types throughout a respective one of the cells. For example, as shown in FIGS. 9B through 9D, different cells can have different font sizes that would result in less accuracy if they were processed as a single image due. However, treated separately, each cell includes characters with similar font size and spacing, making it easier to detect and identify the characters.

In an embodiment, the controller 106 can be configured to define the image cells (e.g., sections 902, 904, and 906) such that they have overlapping borders (e.g., overlapping regions 908 between sections 902 and 904 and overlapping regions 910 between sections 904 and 906, as shown in FIG. 9A) so that characters located between two image cells can be detected. To avoid multiple counts of a same character (e.g., a character identified in two or more cells), when the controller 106 performs OCR passes for different cells and identifies a character at the same location (e.g., x-y coordinates) of the image (e.g., the original image (FIG. 9A)), the controller 106 can be configured to select an identification for the character based upon a comparison of respective confidence levels associated with the different OCR passes. For example, the character identification associated with the highest confidence level can be selected for synthesizing the resulting text of the cell-based OCR.

Figure 4E:
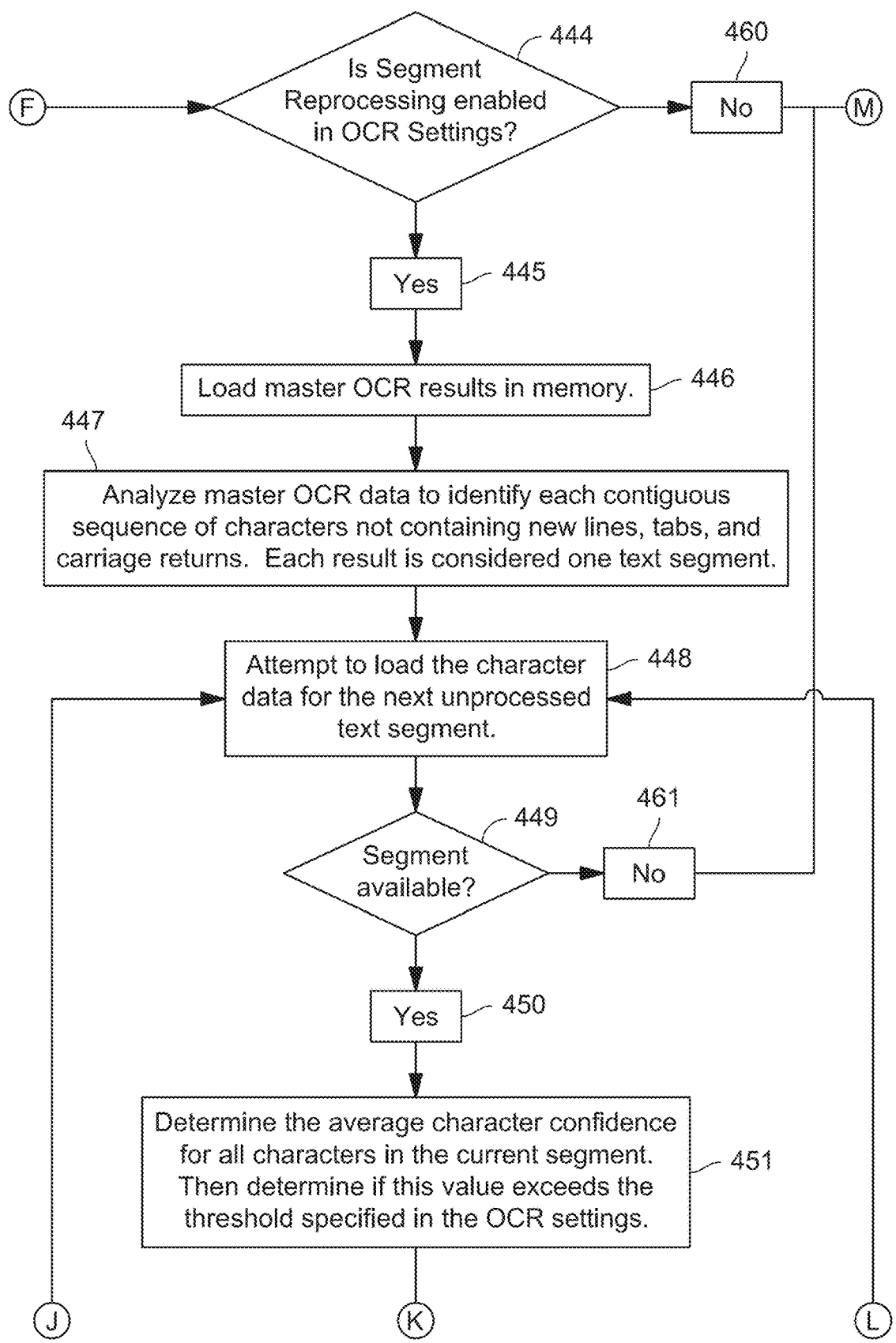
FIG. 4E is a flow diagram illustrating part of a process that employs an OCR system, such as the system illustrated in FIG. 1, to perform OCR analysis on one or more documents, in accordance with an example implementation of the present disclosure.
Figure 4F:
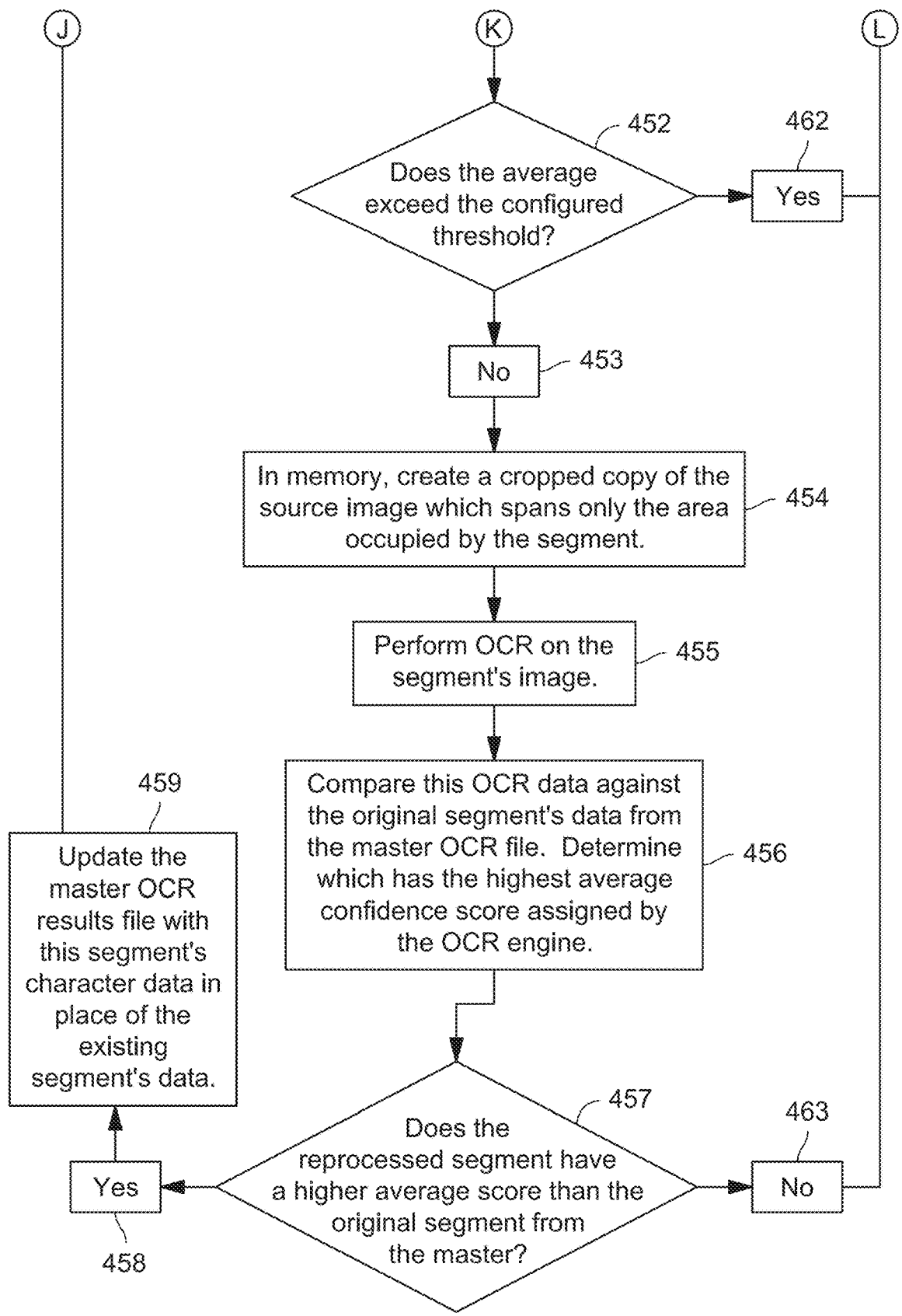
FIG. 4F is a flow diagram illustrating part of a process that employs an OCR system, such as the system illustrated in FIG. 1, to perform OCR analysis on one or more documents, in accordance with an example implementation of the present disclosure.
Figure 4G:
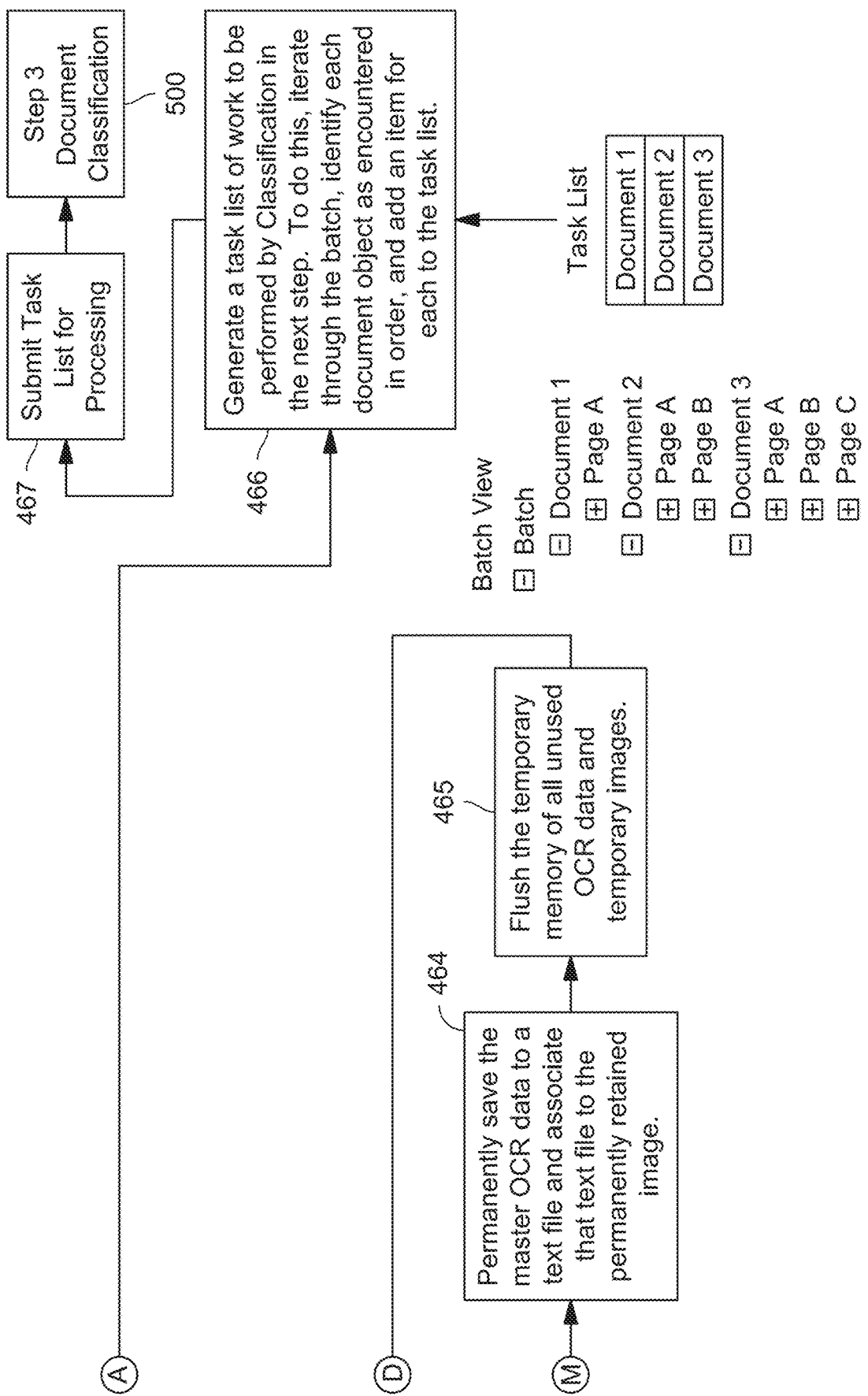
FIG. 4G is a flow diagram illustrating part of a process that employs an OCR system, such as the system illustrated in FIG. 1, to perform OCR analysis on one or more documents, in accordance with an example implementation of the present disclosure.

As shown in FIGS. 4E and 4F, in implementations, the controller 106 may be configured to perform segment-based OCR analysis on one or more documents/images (block 444). If segment-based OCR processing is not enabled (block 460) or OCR analysis has been performed on all identified segments in an image (block 461), the controller 106 may be configured to terminate processing. If segment-based OCR processing is enabled (block 445), the controller 106 is configured to load master OCR results in memory (block 446). The controller 106 is then configured to identify contiguous sequences of characters as segments of text (block 447). For example, the controller 106 can be configured to determine whether a string of characters is a segment based on whitespace between an identified character and the next. In some instances, a carriage return or a tab may indicate a beginning or end of a segment. The controller 106 is then configured to process the segments, one at a time. For example, the controller 106 can attempt to load an unprocessed segment (block 448). When the controller 106 determines that an unprocessed segment is available for OCR analysis (blocks 449 and 450), the controller 106 is configured to determine an average character confidence level for all of the characters in the segment and compare the average character confidence level for the segment with the threshold character confidence level specified in the OCR settings (block 451). If the average character confidence level for the segment exceeds the threshold character confidence level (blocks 452 and 462), the controller 106 is configured to process the next segment (block 448). If the average character confidence level for the segment is below the threshold character confidence level (blocks 452 and 453), the controller 106 is configured to generate a cropped copy of the image by removing portions of the image other than a portion of the image occupied by the segment (block 454). The controller 106 can then perform and OCR pass on the segment, isolated from the rest of the image (e.g., by performing OCR analysis on the cropped copy of the image) (block 455). The controller 106 is then configured to determine a new average character confidence level for the segment based on the OCR pass performed on the segment alone, and the controller 106 is further configured to compare the new average character confidence level with the previously determined average character confidence level for the segment (based on the full image OCR analysis) (block 456). If the previously determined average character confidence level for the segment is higher than the new average character confidence level for the segment (blocks 457 and 463), the master OCR results list remains unchanged, and the controller 106 proceeds to perform the same analysis on the next segment (block 448). If the new average character confidence level for the segment is higher than the previously determined average character confidence level for the segment (blocks 457 and 458), the controller 106 is configured to update the master OCR results list by replacing the information corresponding to the previously recognized segment of characters with the information corresponding to the new character identifications for the segment (block 459). The controller 106 performs the same analysis on the next segment (if available) (block 448), until all segments have been processed and/or updated.

Figure 10:
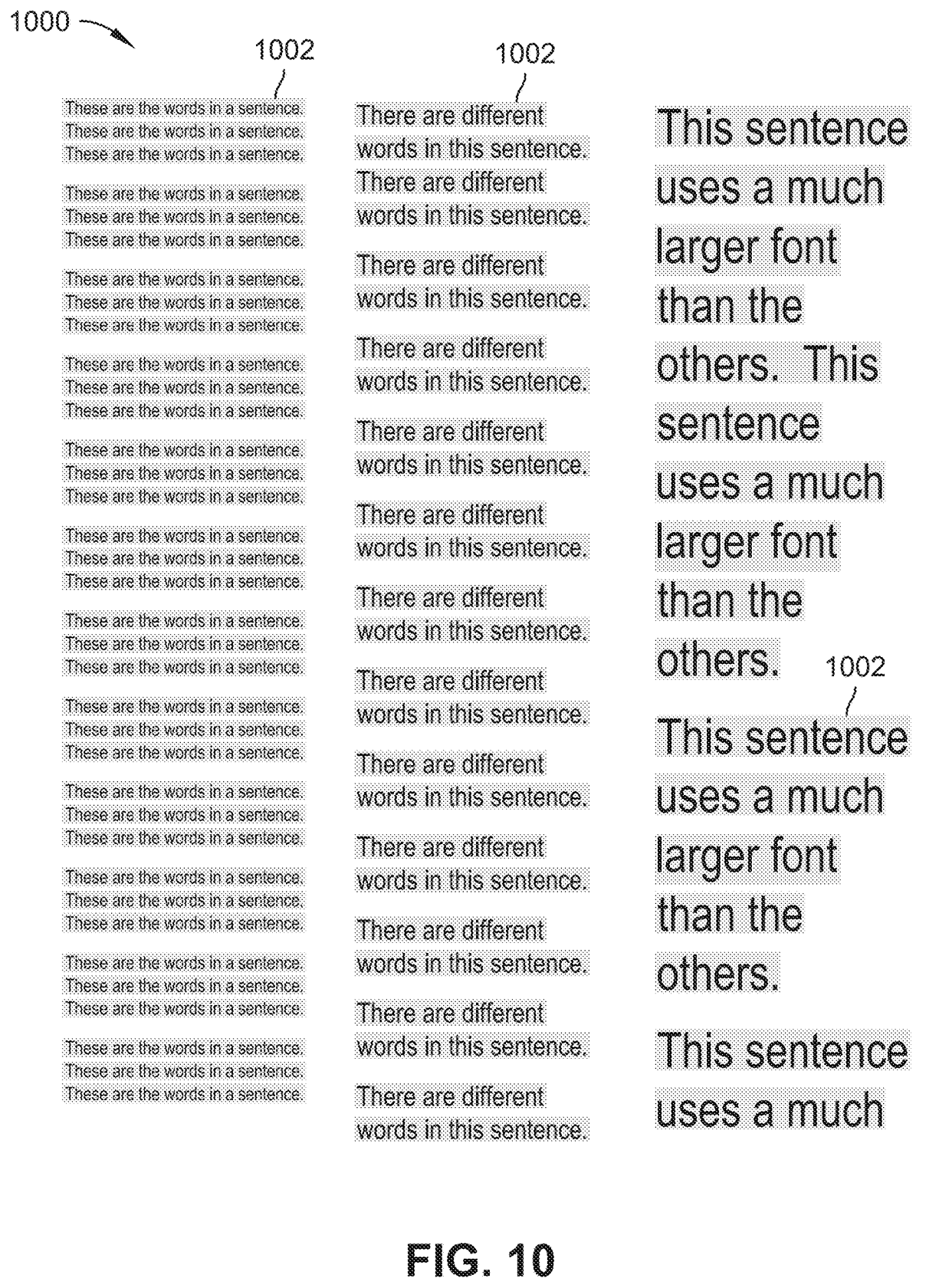

FIG. 10 shows an example segmentation of a source document for a segment-based OCR process that can be carried out by the controller 106. The controller 106 can be configured to detect segments 1002 of text in an image 1000 and reprocess certain ones of the segments 1002 when they do not meet a threshold confidence level (e.g., when an average confidence level for identified characters in a segment is less than the threshold confidence level). The controller 106 can be configured to define a plurality of segments 1002 within an image 1000 (e.g., highlighted portions of the image in FIG. 10) based upon detected whitespace between groupings of characters or strings. For example, a segment can include string of text which is preceded and followed by a threshold amount of whitespace, such as the beginning of document, end of document, tab, carriage return, line feed, or form feed.

The controller can be configured to run an analysis of each segment of text after performing a first OCR pass on the image to determine a confidence level for each segment. For example, the controller 106 can be configured to perform a first OCR pass on the image to identify a plurality of characters of the image. In some instances, the controller 106 may identify a first set of one or more characters located in a first segment of the image, wherein an identification of the first set of one or more characters is associated with a first confidence level that is at least a threshold confidence level. The controller 106 may also identify a second set of one or more characters located in a second segment of the image, wherein a first identification of the second set of one or more characters is associated with a second confidence level that is below the threshold confidence level. In such a scenario, the controller 106 can be configured to perform a second OCR pass on the second segment of the image to identify the second set of one or more characters a second time, wherein a second identification of the second set of one or more characters is associated with a third confidence level.

In an embodiment, the controller 106 can be configured to calculate the average character confidence level across all characters within a segment. The controller 106 can be configured to compare the confidence level for a segment with confidence level threshold (e.g., measured in %) to determine whether or not to reprocess the segment. For example, if the threshold confidence level is set to 80%, and the average confidence level for a segment is determined to be 75%, then the controller 106 can be configured to reprocess the segment. When a segment is to be reprocessed, the controller 106 can generate a temporary image including that segment of text. In some embodiments, the temporary image only includes one segment to be reprocessed. For example, segments 1002 that do not meet the confidence level threshold on the first OCR pass can be individually reprocessed. In other embodiments, the temporary image includes multiple segments 1002 that need to be reprocessed. For example, segments that did not meet the confidence level threshold on the first OCR pass can be processed together in an image that excludes the segments 1002 that did meet the confidence level threshold.

After reprocessing the segments 1002 that did not meet the threshold confidence level in the first OCR pass, the controller 106 can be configured to synthesize the text together as a single result, wherein if the confidence level for a segment is improved from the first OCR pass, character identifications associated with the reprocessed segment will be selected for synthesizing the resulting text. For example, the controller 106 can be configured to select the first identification of the second set of one or more characters or the second identification of the second set of one or more characters based upon a comparison of the second confidence level and the third confidence level (e.g., where the identification associated with the higher confidence level is selected).

After performing OCR analyses process(es) (e.g., standard OCR, iterative OCR, cell-based OCR, and/or segment-based OCR), the controller 106 is configured to save a final version of the master OCR list to memory and associate the master OCR list to the document/image that was analyzed (block 464). The controller 106 can also be configured to flush all temporary image/data files from the memory (block 465). The controller 106 may perform OCR analysis on a next item from the task list until all items (e.g., documents/images) have been analyzed (block 405). In implementations, the controller 106 may generate another task list (classification task list) for classifying each of the documents that were processed by performing OCR analysis (block 466). The controller 106 may be configured to submit/store the classification task list for use in the document classification process 500 (block 467).

Figure 5A:
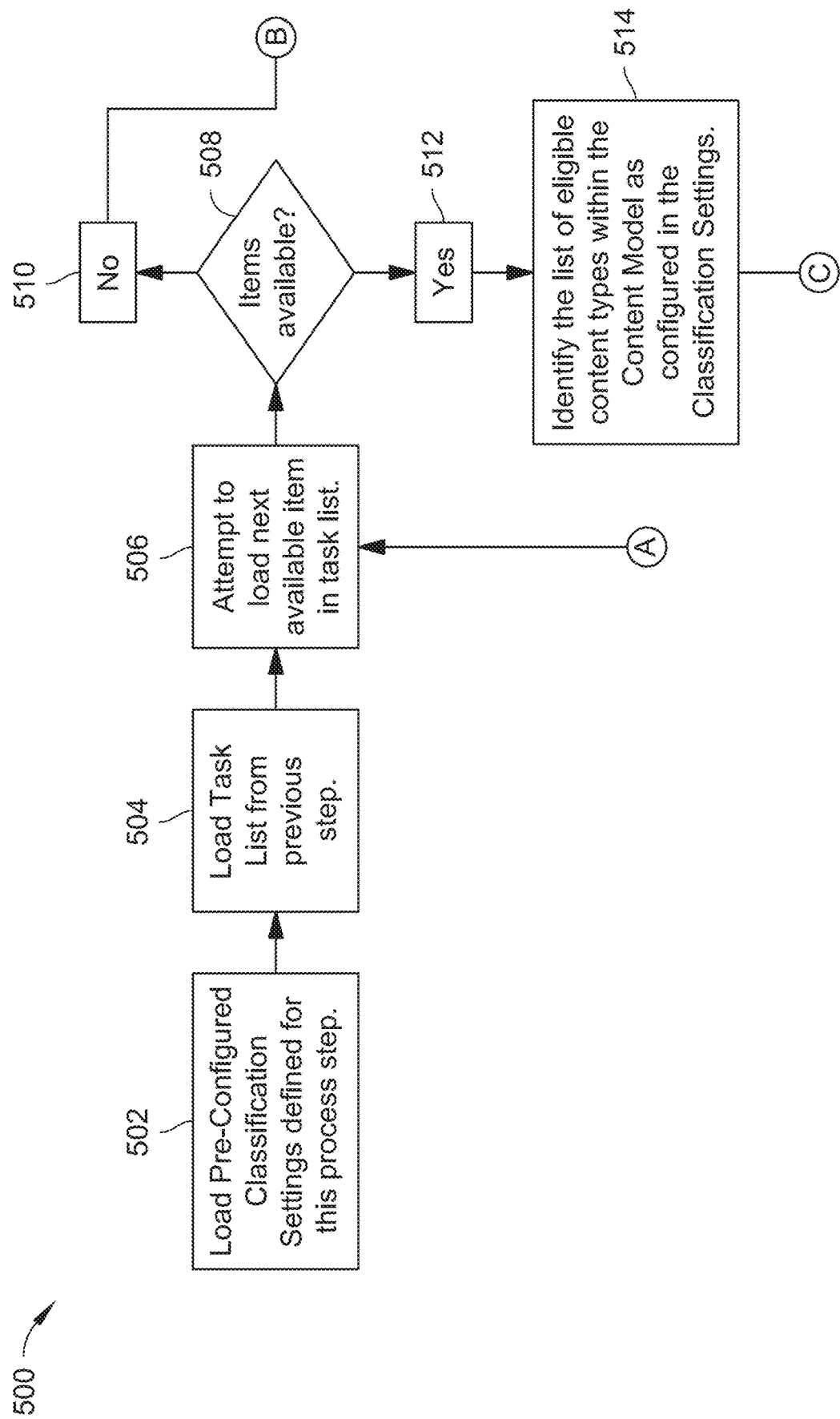
FIG. 5A is a flow diagram illustrating part of a process that employs an OCR system, such as the system illustrated in FIG. 1, to classify one or more documents for OCR-based data extraction, in accordance with an example implementation of the present disclosure.
Figure 5B:
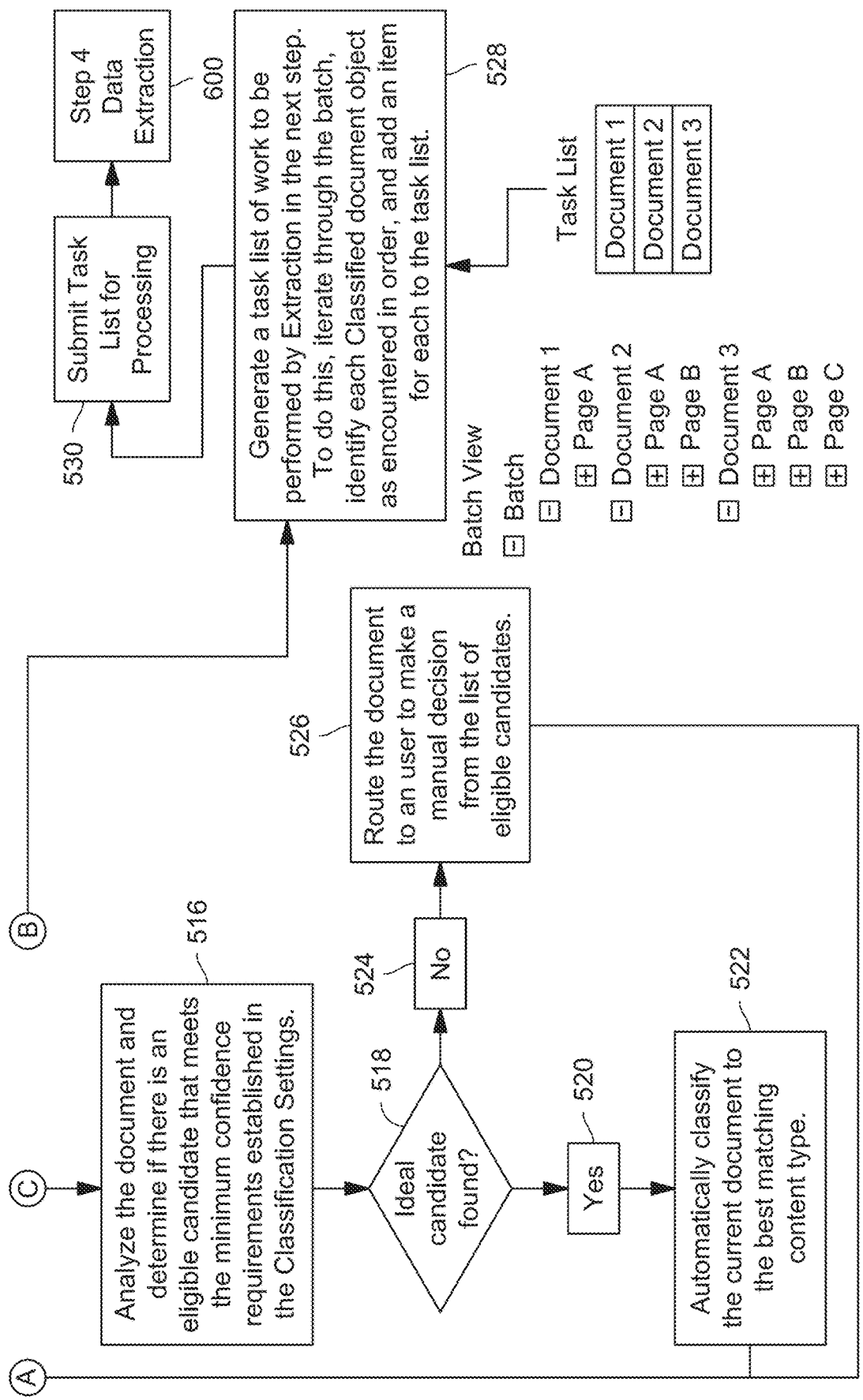
FIG. 5B is a flow diagram illustrating part of a process that employs an OCR system, such as the system illustrated in FIG. 1, to classify one or more documents for OCR-based data extraction, in accordance with an example implementation of the present disclosure.
Figure 6A:
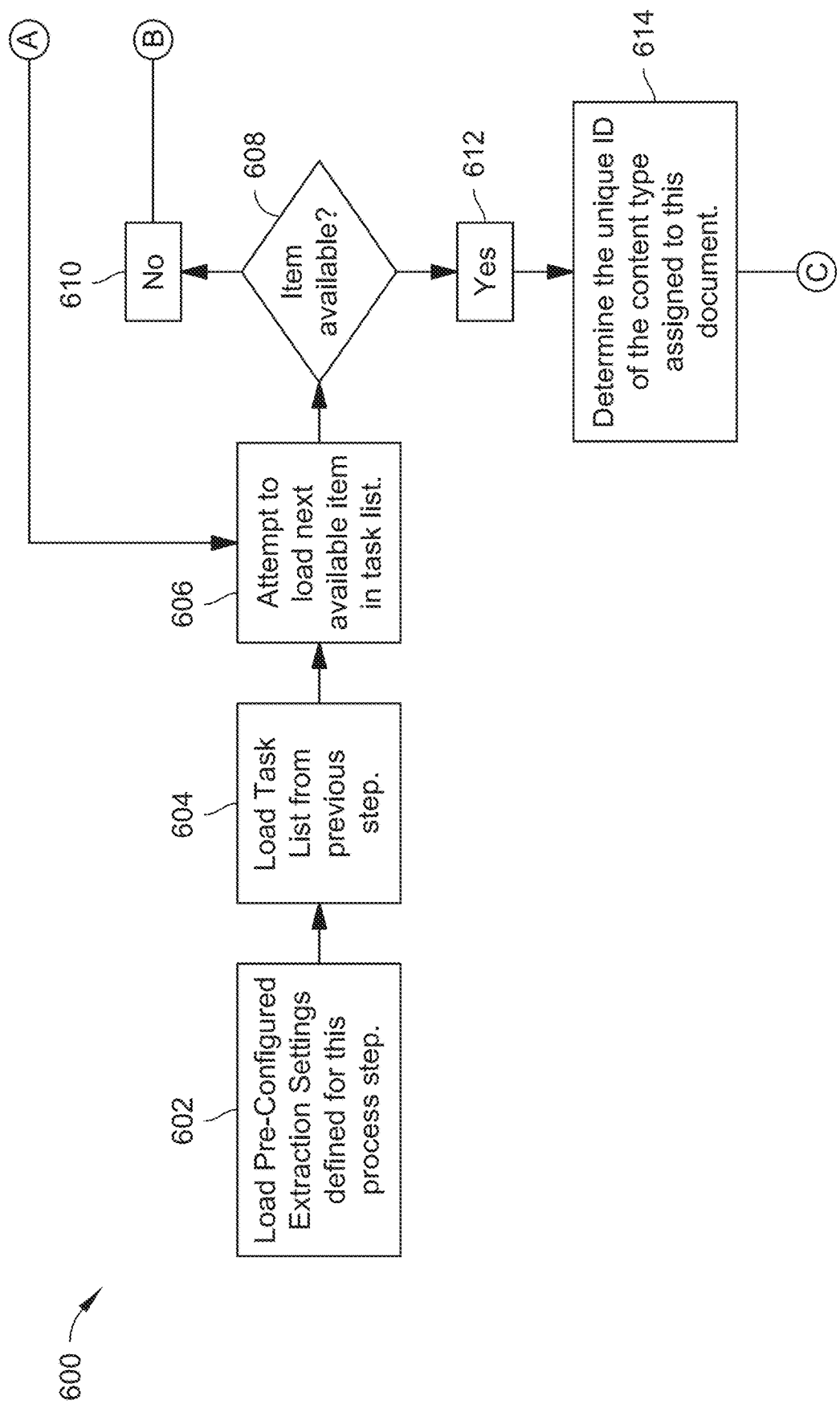
FIG. 6A is a flow diagram illustrating part of a process that employs an OCR system, such as the system illustrated in FIG. 1, to extract data from one or more documents based on respective data extraction models, in accordance with an example implementation of the present disclosure.
Figure 6B:
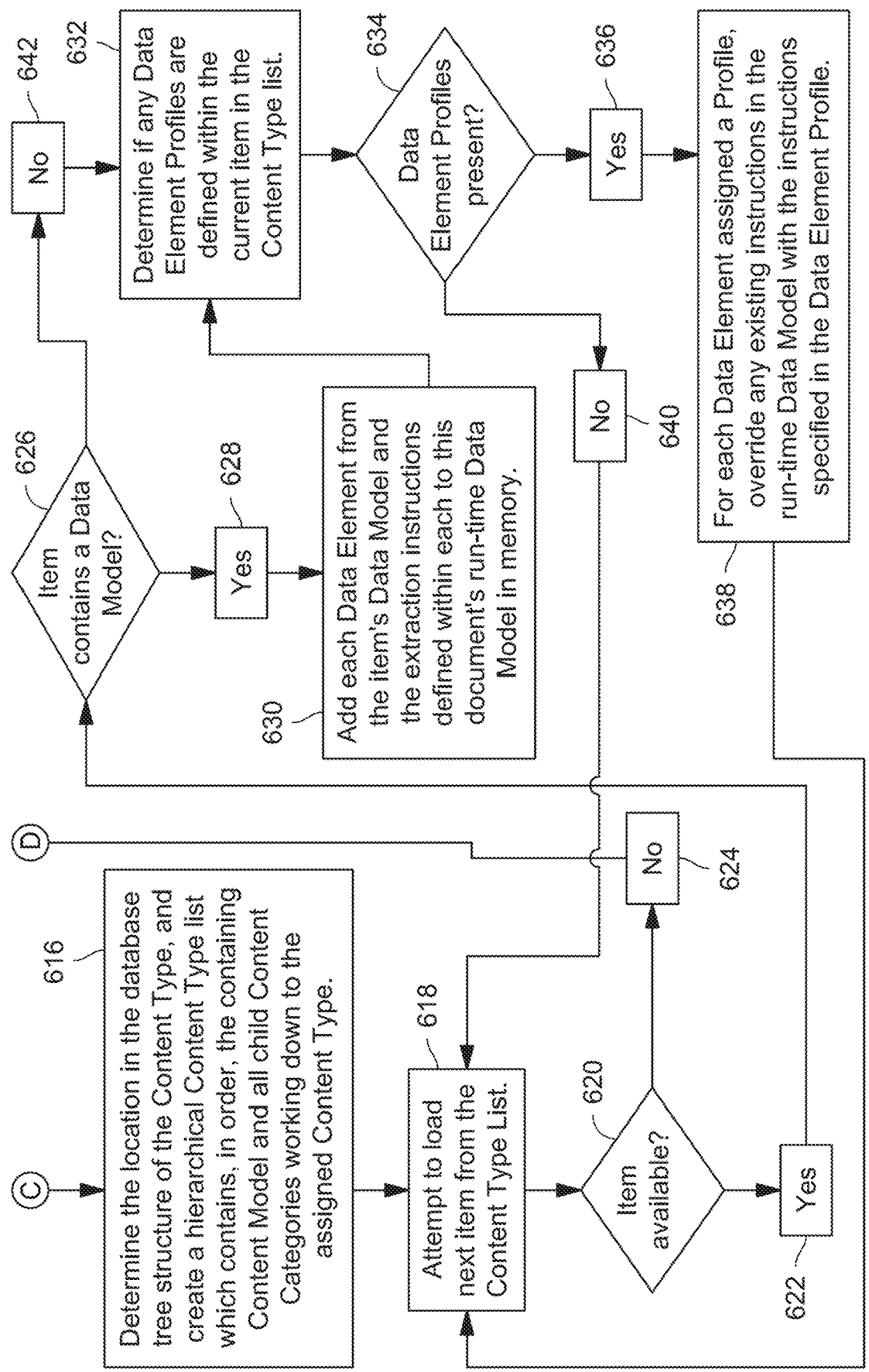
FIG. 6B is a flow diagram illustrating part of a process that employs an OCR system, such as the system illustrated in FIG. 1, to extract data from one or more documents based on respective data extraction models, in accordance with an example implementation of the present disclosure.
Figure 6C:
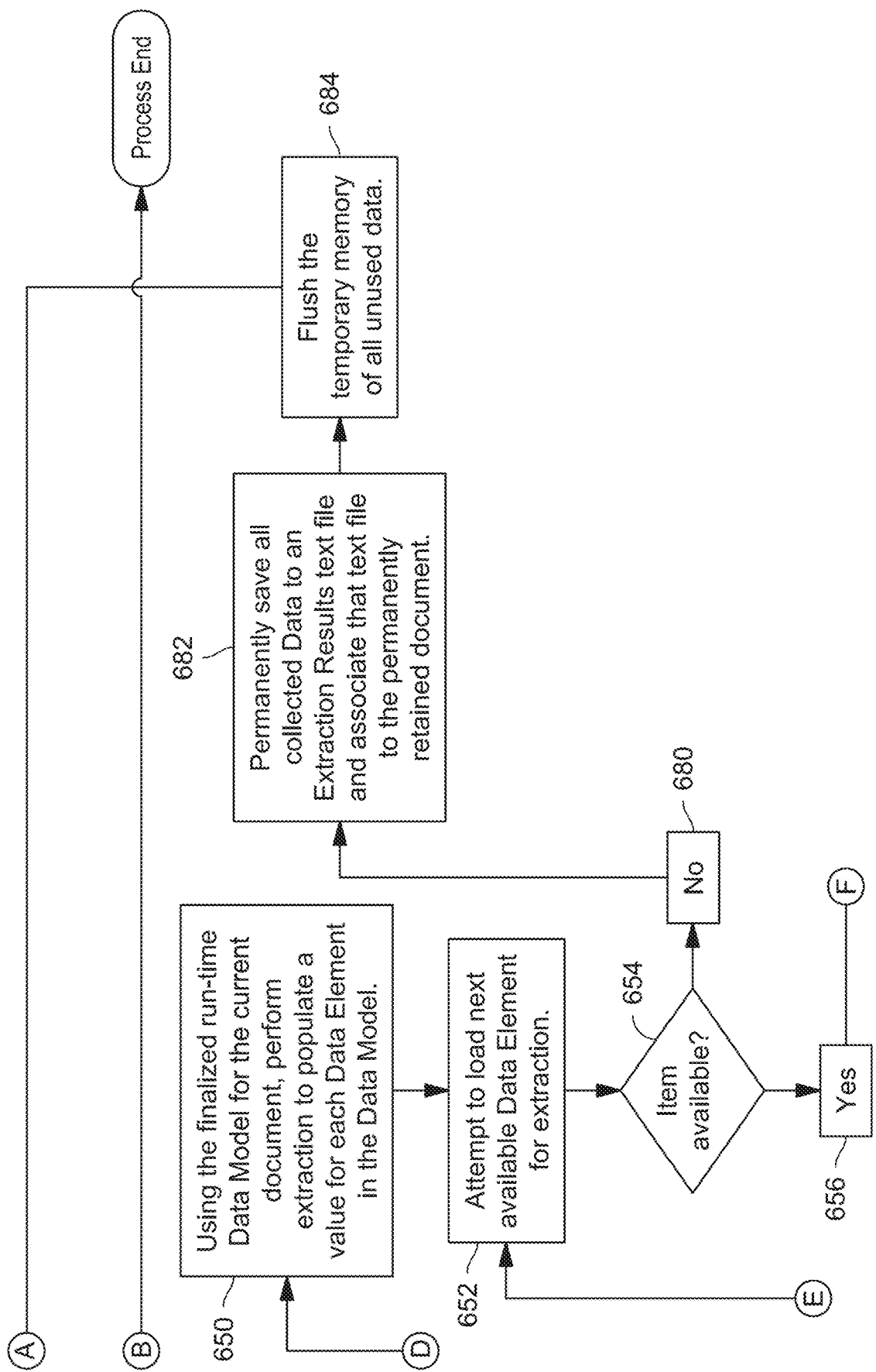
FIG. 6C is a flow diagram illustrating part of a process that employs an OCR system, such as the system illustrated in FIG. 1, to extract data from one or more documents based on respective data extraction models, in accordance with an example implementation of the present disclosure.
Figure 6D:
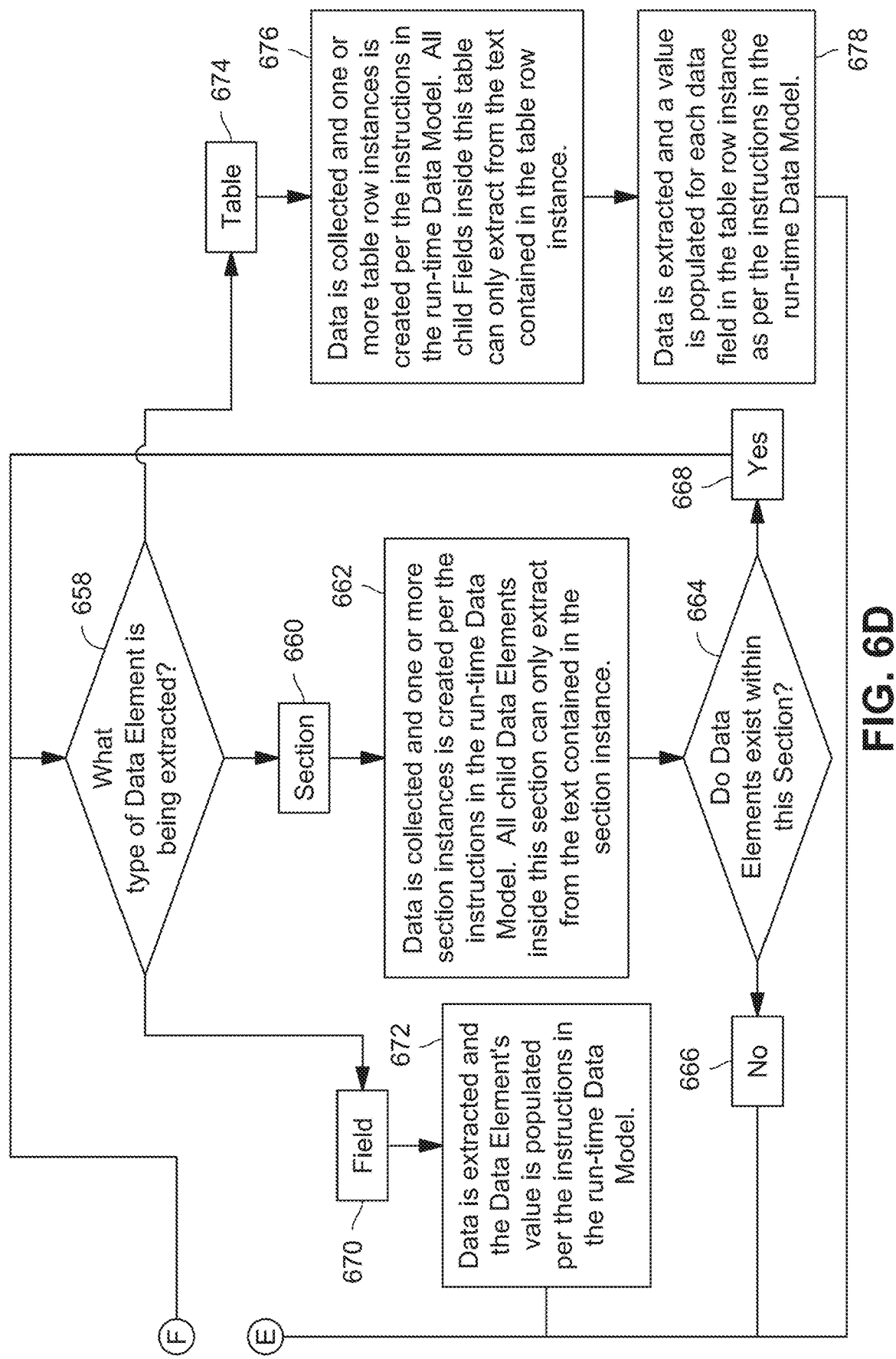
FIG. 6D is a flow diagram illustrating part of a process that employs an OCR system, such as the system illustrated in FIG. 1, to extract data from one or more documents based on respective data extraction models, in accordance with an example implementation of the present disclosure.

FIGS. 5A and 5B illustrate a process 500 for classifying one or more documents/images for OCR-based data extraction, in accordance with an example implementation of the present disclosure. The controller 106 can be configured to load pre-configured document classification settings (block 502). For example, the controller 106 can be configured to load document content types and/or models based on default settings and/or user selection(s). Content type classifies the document being processed. For example, content type may include, but is not limited to, content category, document type, and form type. Categories are used as an organizational unit to better organize large lists of related document types. Document types exist to differentiate one document from another, for example, Sales Order, Invoice, Purchase Order, Shipping Confirmation. Each of these may contain different data elements to be collected. Form types exist because some document types have multiple variations. Each form type is essentially a variation of a document type. Example content models for an invoice processing solution are provided below.

I. Content Category—PO-Based Invoices
  1. Document Type—Vendor 1
    i. Form Type—1 page variation
    ii. Form Type—2 page variation
  2. Document Type—Vendor 2
    i. Form Type—1 page variation
  3. Document Type—Vendor 3
    i. Form Type—3 page variation
II. Content Category—Non PO-Based Invoices
  1. Document Type—Vendor A
    i. Form Type—1 page variation
  2. Document Type—Vendor B
    i. Form Type—1 page variation
  3. Document Type—Vendor C
    i. Form Type—1 page variation The use of categories in the example above allows the OCR system to organize a list of vendor document types based on whether or not the vendor uses POs. The OCR system can then apply instructions for one or more data elements for all vendors within the category by specifying the instructions only one time at the category level. Without this mechanism in place, it is necessary to set the rule for each document type independently, which would be cumbersome and difficult to maintain over time. If a PO Number is to be collected from each document, the OCR system can simply disable the PO number field completely for those invoices that are known to not have a PO number (e.g., based on the content type).

A data type in its simplest form is a regular expression pattern that identifies a sequence of characters on a page. In an accounting application, a pattern that would find an invoice number can be written. For example, on invoices that come from most vendors, the invoice number is in the format of a five digit number. Accordingly, the OCR system can be configured to look for such a pattern (e.g., defined as [0-9]{5}). This pattern would by default apply to any invoice regardless of vendor. Now, on invoices that come from one specific vendor, the invoice number format may be totally different. For example, it may begin with one letter, then three numbers, then another letter. In this situation, the OCR system can use a data element profile on the vendor's content type to override the invoice number field for the content model associated with that content type. In this regard, the run-time data extraction model changes from the base content model to a new model that has override instructions based on the data element profile for the vendor. For example, the data element profile/override can support a data type (e.g., "invoice number") that uses a different expression pattern (e.g., defined as [A-Z][0-9]{3}[A-Z]) than the invoice number patter used by the base content model.

The controller 106 may load a classification task list, such as the classification task list generated at the end of process 400 (block 504). The controller 106 may begin to process each item (e.g., document/image) in the classification task list (block 506). For example, the controller 106 can be configured to determine if any items are available in the task list (e.g., items that are waiting to be processed) (block 508). When items that have not yet been classified are available (block 512), the controller 106 is configured to identify a list of eligible content types within the content model as configured in the classification settings (block 514). For example, the controller 106 can be configured to detect an identifier and/or one or more data types in the document and determine whether the identifier and/or data types correspond to a content type and/or model stored in memory. The controller 106 is configured to determine whether there is at least a threshold correspondence to a stored content type and/or model (block 516). If a candidate is identified (e.g., a content type and/or model that meets the threshold correspondence) (blocks 518 and 520), the controller 106 is configured to automatically classify the document/image as corresponding to the candidate content type and/or model (block 522). When a candidate cannot be identified (e.g., no content type meets the threshold correspondence) (blocks 518 and 524), the controller 106 may be configured to prompt a user (e.g., via communication interface 114) to manually select or enter a content type and/or model that corresponds to the document/image being analyzed (block 526). The controller 106 may classify the next items in the classification task list in the same manner until all items (e.g., documents/images) have been classified (block 510). In implementations, the controller 106 may generate another task list (data extraction task list) for extracting data elements from each of the documents that were classified as corresponding to a content type and/or model (block 528). The controller 106 may be configured to submit/store the data extraction task list for use in the OCR-based data extraction process 600 (block 530).

FIGS. 6A through 6D illustrate a process 600 for extracting data from one or more documents based on respective data extraction models, in accordance with an example implementation of the present disclosure. The controller 106 can be configured to load pre-configured document data extraction settings (block 602). For example, the controller 106 can be configured to load data models assigned to documents and/or corresponding to document content types based on default settings and/or user selection(s). The controller 106 may load a data extraction task list, such as the data extraction task list generated at the end of process 500 (block 604). The controller 106 may begin to process each item (e.g., document/image) in the data extraction task list (block 606). For example, the controller 106 can be configured to determine if any items are available in the task list (e.g., items that are waiting to be processed) (block 608). When items that have not yet been processed are available (block 612), the controller 106 is configured to determine a content type for an item being analyzed (block 614). For example, the controller 106 can be configured to detect an identifier and/or one or more data types in the document and determine whether the identifier and/or data types correspond to a content type and/or model stored in memory. In another example, the identifier and/or content type are already assigned (e.g., based on a document classification process 500).

The controller 106 is configured to determine a location in memory (e.g., in a database) of the content type and generate a hierarchical content type list that contains a content model and all child content categories working down to the assigned content type (block 616). The controller 106 can then load items (e.g., data types) from the content type list and determine whether the items are available in the document (blocks 618 and 620). When the current document's content type is determined to have parent content models and/or categories in the defined hierarchy (block 622), the controller determines whether the content model and/or category has an assigned data model (block 626). If the item has an assigned data model (block 628), the controller 106 is configured to add each data element from the data type's data model and the associated extraction instructions (e.g., instructions based on the data element model/profile) to the run-time data model for the document (block 630). The controller 106 may also determine whether any data element profiles/overrides for the data type are defined in the content type list (block 632). In there are no data element profiles/ overrides for the data type, the controller 106 can proceed to load the next item from the content type list (block 618). If any data element profiles/overrides are present (blocks 634 and 636), the controller 106 can be configured to override any existing instructions in the run-time data model with the instructions specified in the data element profile (block 638). For example, the data element profile/override can be defined by a user manually and/or predefined for particular documents, different versions of documents (e.g., different formats, different originators/entities, etc.), and so forth. After updating the run-time data model for the document, the controller 106 is configured to load the next item from the content type list (block 618).

When all items (e.g., data types/elements) in the document have been assigned instructions in the run-time data model (block 624), the controller 106 is configured to perform OCR-based data extraction on the document using the finalized run-time data model (block 650). The controller 106 is configured to perform data extraction based on the hierarchy of data types in the run-time model for the document. For example, the controller 106 is configured to load data elements for extraction (block 652). In implementations, the controller 106 is configured to detect a pattern of characters associated with a data type by searching for the pattern of characters in the image. If the data type is available in the image (blocks 654 and 656), the controller 106 is configured to determine what type of data element is being extracted (block 658). For example, the data type can indicate a data element associated with a portion (e.g., section, table, and/or field) of the image. If the data type corresponds to a section (block 660), the controller 106 is configured to collect data within the section (e.g., headings, fields, and/or table entries) from the OCR results by searching within the section based on the run-time data model that defines the hierarchy of data elements within the document (e.g., sections, sub-sections, tables, fields, etc.) (block 662). For example, data elements can be nested within or below other data elements (e.g., sub-sections or tables within sections, and/or fields within a section, sub-section, and/or table, and so forth). The controller 106 is configured to determine whether data elements exist within a portion of the image corresponding to the section (block 664). For example, the controller 106 may detect a second pattern of characters associated with a second data type (e.g., a sub-section, table, or field) by searching for the pattern of characters in the portion of the image corresponding to the section. If there are no data elements within the section (block 666), the controller 106 loads the next available data element for extraction (block 652). If the data element (e.g., within the image and/or within a section) is a field (e.g., name, value, label, or other field of information) (block 670), the controller 106 is configured to collect the data (e.g., the field value, text, etc.) from the OCR results (block 672). If the data element (e.g., within the image and/or within a section) is a table (block 674), the controller 106 is configured to collect the data (e.g., fields) from OCR results of the table row and/or column instances based on the run-time data model (blocks 676 and 678).

The controller 106 continues to load data elements for extraction (block 652) until all items have been extracted from the document/image (block 680). The controller 106 is configured to save all collected data to an extraction results file and associate the extraction results with the document/image stored in memory (block 682). The controller 106 may then flush all unused data from temporary memory (block 684) and proceed to extract data from the next document/image according to the data extraction task list (block 606). When the controller 106 has performed data extraction on all of the documents/images in the data extraction task (block 610), the process 600 may terminate.

CONCLUSION

The various functions, operations, processing blocks, or steps described throughout the present disclosure may be carried out in any order, by any combination of hardware, software, or firmware. For example, controller 106 may be configured to execute any of the functions, operations, steps, or processing blocks described herein. In embodiments, the controller 106 can include one or more of the following: electronic circuitry, logic gates, multiplexers, a programmable logic device, an application-specific integrated circuit (ASIC), a controller/microcontroller, or a computing system (e.g., personal computer, server, mobile device (e.g., notebook, smartphone, or tablet), or the like). The controller 106 can include any device having at least one processor (e.g., processor 108) configured to execute program instructions (e.g., software modules, such as OCR modules 112) from a carrier medium (e.g., memory 110). In embodiments, the carrier medium includes a non-transitory signal bearing medium or storage medium such as, but not limited to, a magnetic or optical disk, a solid-state or flash memory device, or the like.

It is contemplated that any embodiment of the disclosure, manifested above as a system or method, may include at least a portion of any other embodiment described herein. Those having skill in the art will appreciate that there are various embodiments by which systems and methods described herein can be implemented, and that the implementation will vary with the context in which an embodiment of the disclosure is deployed. Furthermore, it is to be understood that the present application is defined by the appended claims. Although embodiments of the present application have been illustrated and described herein, it is apparent that various modifications may be made by those skilled in the art without departing from the scope and spirit of this disclosure.

What is claimed is:

1. A method for iterative optical character recognition, comprising:
  performing an optical character recognition pass on an image to identify a plurality of characters of the image;
  identifying a first character located in a first portion of the image, wherein an identification of the first character is associated with a first character confidence level that is at least a threshold character confidence level;

identifying a second character located in a second portion of the image, wherein a first identification of the second character is associated with a second character confidence level that is below the threshold character confidence level;

performing an additional optical character recognition pass on the second portion of the image to identify the second character a second time, wherein a second identification of the second character is associated with a third character confidence level; and selecting either the first identification of the second character or the second identification of the second character based upon a comparison of the second character confidence level and the third character confidence level.

2. The method of claim 1, wherein performing the additional optical character recognition pass on the second portion of the image to identify the second character the second time includes:

storing a copy of the image in a memory; and modifying the copy of the image to remove the first portion of the image from the copy of the image and leave the second portion of the image in the copy of the image; and performing the additional optical character recognition pass on the copy of the image after modifying the copy of the image to remove the first portion of the image from the copy of the image and leave the second portion of the image in the copy of the image.

3. The method of claim 1, further comprising:

defining at least a first section and a second section of an image;

performing a first optical character recognition pass on the first section of the image to identify a first plurality of characters of the image; and performing a second optical character recognition pass on the second section of the image to identify a second plurality of characters of the image.

4. The method of claim 3, wherein performing the first optical character recognition pass on the first section of the image to identify the first plurality of characters of the image includes:

storing a copy of the image in a memory; and cropping the copy of the image to remove the second section of the image from the copy of the image and leave the first section of the image in the copy of the image; and performing the first optical character recognition pass on the copy of the image after cropping the copy of the image to remove the second section of the image from the copy of the image and leave the first section of the image in the copy of the image.

5. The method of claim 3, wherein performing the second optical character recognition pass on the second section of the image to identify the second plurality of characters of the image includes:

storing a copy of the image in a memory; and cropping the copy of the image to remove the first section of the image from the copy of the image and leave the second section of the image in the copy of the image; and performing the second optical character recognition pass on the copy of the image after cropping the copy of the image to remove the first section of the image from the copy of the image and leave the second section of the image in the copy of the image.

6. The method of claim 3, wherein the first and second sections of the image are defined based on at least one of: a user defined page layout, a programmed page layout, or a detected page layout.

7. The method of claim 1, further comprising:

detecting a plurality of segments defined by contiguous sequences of characters in the image;

performing a first optical character recognition pass on the image to identify characters in the plurality of segments of the image;

identifying a first set of one or more characters located in a first segment of the image, wherein an identification of the first set of one or more characters is associated with a first segment confidence level that is at least a threshold segment confidence level;

identifying a second set of one or more characters located in a second segment of the image, wherein a first identification of the second set of one or more characters is associated with a second segment confidence level that is below the threshold segment confidence level;

performing a second optical character recognition pass on the second segment of the image to identify the second set of one or more characters a second time, wherein a second identification of the second set of one or more characters is associated with a third segment confidence level; and selecting the first identification of the second set of one or more characters or the second identification of the second set of one or more characters based upon a comparison of the second segment confidence level and the third segment confidence level.

8. The method of claim 7, wherein performing the second optical character recognition pass on the second segment of the image to identify the second set of one or more characters the second time includes:

storing a copy of the image in a memory; and cropping the copy of the image to remove portions of the image other than the second segment of the image in the copy of the image; and performing the second optical character recognition pass on the copy of the image after cropping the copy of the image to remove portions of the image other than the second segment of the image in the copy of the image.

9. A system for iterative optical character recognition, comprising:

a controller including at least one processor configured to execute one or more modules stored by a memory that is communicatively coupled to the at least one processor, the one or more modules, when executed, causing the processor to:

perform an optical character recognition pass on an image to identify a plurality of characters of the image;

identify a first character located in a first portion of the image, wherein an identification of the first character is associated with a first character confidence level that is at least a threshold character confidence level;

identify a second character located in a second portion of the image, wherein a first identification of the second character is associated with a second character confidence level that is below the threshold character confidence level;

perform an additional optical character recognition pass on the second portion of the image to identify the second character a second time, wherein a second identification of the second character is associated with a third character confidence level; and select the first identification of the second character or the second identification of the second character based upon a comparison of the second character confidence level and the third character confidence level.

10. The system of claim 9, wherein the one or more modules, when executed, cause the processor to perform the additional optical character recognition pass on the second portion of the image to identify the second character the second time by:

storing a copy of the image in the memory; and modifying the copy of the image to remove the first portion of the image from the copy of the image and leave the second portion of the image in the copy of the image; and performing the additional optical character recognition pass on the copy of the image after modifying the copy of the image to remove the first portion of the image from the copy of the image and leave the second portion of the image in the copy of the image.

11. The system of claim 9, wherein the one or more modules, when executed, further cause the processor to:

define at least a first section and a second section of an image;

perform a first optical character recognition pass on the first section of the image to identify a first plurality of characters of the image; and perform a second optical character recognition pass on the second section of the image to identify a second plurality of characters of the image.

12. The system of claim 11, wherein the one or more modules, when executed, cause the processor to perform the first optical character recognition pass on the first section of the image to identify the first plurality of characters of the image by:

storing a copy of the image in a memory; and cropping the copy of the image to remove the second section of the image from the copy of the image and leave the first section of the image in the copy of the image; and performing the first optical character recognition pass on the copy of the image after cropping the copy of the image to remove the second section of the image from the copy of the image and leave the first section of the image in the copy of the image.

13. The system of claim 11, wherein the one or more modules, when executed, cause the processor to perform the second optical character recognition pass on the second section of the image to identify the second plurality of characters of the image by:

storing a copy of the image in a memory; and cropping the copy of the image to remove the first section of the image from the copy of the image and leave the second section of the image in the copy of the image; and performing the second optical character recognition pass on the copy of the image after cropping the copy of the image to remove the first section of the image from the copy of the image and leave the second section of the image in the copy of the image.

14. The system of claim 11, wherein the first and second sections of the image are defined based on at least one of: a user defined page layout, a programmed page layout, or a detected page layout.

15. The system of claim 9, wherein the one or more modules, when executed, further cause the processor to:

detect a plurality of segments defined by contiguous sequences of characters in the image;

perform a first optical character recognition pass on the image to identify characters in the plurality of segments of the image;

identify a first set of one or more characters located in a first segment of the image, wherein an identification of the first set of one or more characters is associated with a first segment confidence level that is at least a threshold segment confidence level;

identify a second set of one or more characters located in a second segment of the image, wherein a first identification of the second set of one or more characters is associated with a second segment confidence level that is below the threshold segment confidence level;

perform a second optical character recognition pass on the second segment of the image to identify the second set of one or more characters a second time, wherein a second identification of the second set of one or more characters is associated with a third segment confidence level; and select the first identification of the second set of one or more characters or the second identification of the second set of one or more characters based upon a comparison of the second segment confidence level and the third segment confidence level.

16. The system of claim 15, wherein the one or more modules, when executed, cause the processor to perform the second optical character recognition pass on the second segment of the image to identify the second set of one or more characters the second time by:

storing a copy of the image in a memory; and cropping the copy of the image to remove portions of the image other than the second segment of the image in the copy of the image; and performing the second optical character recognition pass on the copy of the image after cropping the copy of the image to remove portions of the image other than the second segment of the image in the copy of the image.

17. A system for iterative optical character recognition, comprising:

an imaging device;

a controller in communication with the imaging device, the controller including at least one processor configured to execute one or more modules stored by a memory that is communicatively coupled to the at least one processor, the one or more modules, when executed, causing the processor to:

perform an optical character recognition pass on an image received from the imaging device to identify a plurality of characters of the image;

identify a first character located in a first portion of the image, wherein an identification of the first character is associated with a first character confidence level that is at least a threshold character confidence level;

identify a second character located in a second portion of the image, wherein a first identification of the second character is associated with a second character confidence level that is below the threshold character confidence level;

perform an additional optical character recognition pass on the second portion of the image to identify the second character a second time, wherein a second identification of the second character is associated with a third character confidence level; and select the first identification of the second character or the second identification of the second character based upon a comparison of the second character confidence level and the third character confidence level.

18. The system of claim 17, wherein the one or more modules, when executed, cause the processor to perform the additional optical character recognition pass on the second portion of the image to identify the second character the second time by:
storing a copy of the image in the memory; and
modifying the copy of the image to remove the first portion of the image from the copy of the image and leave the second portion of the image in the copy of the image; and
performing the additional optical character recognition pass on the copy of the image after modifying the copy of the image to remove the first portion of the image from the copy of the image and leave the second portion of the image in the copy of the image.

19. The system of claim 17, wherein the one or more modules, when executed, further cause the processor to:
define at least a first section and a second section of an image;
perform a first optical character recognition pass on the first section of the image to identify a first plurality of characters of the image; and
perform a second optical character recognition pass on the second section of the image to identify a second plurality of characters of the image.

20. The system of claim 17, wherein the one or more modules, when executed, further cause the processor to:
detect a plurality of segments defined by contiguous sequences of characters in the image;
perform a first optical character recognition pass on the image to identify characters in the plurality of segments of the image;
identify a first set of one or more characters located in a first segment of the image, wherein an identification of the first set of one or more characters is associated with a first segment confidence level that is at least a threshold segment confidence level;
identify a second set of one or more characters located in a second segment of the image, wherein a first identification of the second set of one or more characters is associated with a second segment confidence level that is below the threshold segment confidence level;
perform a second optical character recognition pass on the second segment of the image to identify the second set of one or more characters a second time, wherein a second identification of the second set of one or more characters is associated with a third segment confidence level; and
select the first identification of the second set of one or more characters or the second identification of the second set of one or more characters based upon a comparison of the second segment confidence level and the third segment confidence level.

* * * * *